(12) United States Patent
Johnson et al.

(10) Patent No.: US 12,463,558 B2
(45) Date of Patent: Nov. 4, 2025

(54) THREE-DIMENSIONAL (3D)-PRINTABLE STRETCHABLE TRIBOELECTRIC NANOGENERATOR FIBERS

(71) Applicant: VIRGINIA TECH INTELLECTUAL PROPERTIES, INC., Blacksburg, VA (US)

(72) Inventors: Blake Johnson, Pembroke, VA (US); Yuxin Tong, Blacksburg, VA (US); John Robertson, Floyd, VA (US); Xiaoting Jia, Blacksburg, VA (US); Ziang Feng, Blacksburg, VA (US)

(73) Assignee: VIRGINIA TECH INTELLECTUAL PROPERTIES, INC., Blackburg (VA)

( * ) Notice: Subject to any disclaimer, the term of this patent is extended or adjusted under 35 U.S.C. 154(b) by 275 days.

(21) Appl. No.: 17/996,288

(22) PCT Filed: Apr. 27, 2021

(86) PCT No.: PCT/US2021/029350
§ 371 (c)(1),
(2) Date: Oct. 14, 2022

(87) PCT Pub. No.: WO2021/222212
PCT Pub. Date: Nov. 4, 2021

(65) Prior Publication Data
US 2023/0208322 A1   Jun. 29, 2023

Related U.S. Application Data

(60) Provisional application No. 63/016,628, filed on Apr. 28, 2020.

(51) Int. Cl.
*H02N 1/04* (2006.01)
*A61B 5/00* (2006.01)
*H01B 13/24* (2006.01)

(52) U.S. Cl.
CPC ............ *H02N 1/04* (2013.01); *A61B 5/4878* (2013.01); *A61B 5/6804* (2013.01); *H01B 13/24* (2013.01)

(58) Field of Classification Search
CPC .......... G06N 5/045; G06N 5/01; G06N 20/00; G06N 20/20; G06F 16/335;
(Continued)

(56) References Cited

U.S. PATENT DOCUMENTS

| 4,101,724 A | 7/1978 | Heine et al. |
| 2007/0087209 A1 | 4/2007 | Farhumand et al. |

(Continued)

FOREIGN PATENT DOCUMENTS

| WO | 2018226162 A1 | 12/2018 |
| WO | 2020081007 A1 | 4/2020 |
| WO | 2021016524 A1 | 1/2021 |

OTHER PUBLICATIONS

International Search Report and Written Opinion for PCT/US2020/043418 mailed Oct. 16, 2020.
(Continued)

*Primary Examiner* — Nahida Sultana
(74) *Attorney, Agent, or Firm* — Perilla Knox & Hildebrandt LLP; Jonathan A. Paulis

(57) ABSTRACT

A fabrication process is disclosed for the production of flexible triboelectric nanogenerator (TENG) fiber, which can comprise a copper core surrounded by a silicone cladding. The TENG fibers are fabricated using a coaxial microextrusion process that enables 2D and 3D constructs to be fabricated with the fibers via 3D printing on both stationary and moving substrates to form mechanosensors as membranes, meshes, and hollow 3D structures. The mechanosensors can be integrated into wearable items for human activity monitoring, or can be formed on organs for organ monitor-
(Continued)

ing, e.g., monitoring of perfused organs. The mechanosensors can be integrated into facemasks and uses for silent speech recognition, such as words mouthed in the absence of sound production by the speaker. The mechanosensors are self-powered and have high stretchability.

18 Claims, 15 Drawing Sheets

(58) Field of Classification Search
CPC . G06F 16/9027; G06F 16/9535; G06Q 30/02; G06Q 30/0224
See application file for complete search history.

(56) References Cited

U.S. PATENT DOCUMENTS

| | | | |
|---|---|---|---|
| 2008/0287022 A1 | 11/2008 | Dhawan et al. | |
| 2009/0260848 A1 | 10/2009 | Perera et al. | |
| 2012/0031642 A1* | 2/2012 | Chambers | B29C 48/06 174/110 N |
| 2016/0136898 A1* | 5/2016 | Jang | H04N 1/644 700/98 |
| 2017/0237365 A1 | 8/2017 | Kwon et al. | |
| 2019/0047240 A1* | 2/2019 | Sorin | G01L 1/242 |
| 2022/0255464 A1 | 8/2022 | Feng et al. | |
| 2023/0409114 A1* | 12/2023 | Sun | G06F 3/017 |
| 2024/0195329 A1* | 6/2024 | Ying | B82Y 30/00 |

OTHER PUBLICATIONS

International Preliminary Report for Patentability for PCT/US2021/029350 mailed Oct. 27, 2022.
International Search Report and Written Opinion for PCTUS2021029350 mailed Aug. 12, 2021.
Feng, "Wearable Power Sources and Self-powered Sensors Based on the Triboelectric Nanogenerators." Diss. Virginia Tech, 2020. Nov. 16, 2020 (Nov. 16, 2020), entire document, [on line] <https://vtechworks.lib.vt.edu/bitstream/handle/10919/103020/Feng_Z_D_2020.pdf? sequence=1 &isAllowed=y>.
Tong et al. "3D printed stretchable triboelectric nanogenerator fibers and devices." Nano Energy 75 (2020): 104973. May 17, 2020 (May 17, 2020), entire document [on line] <https://par.nsf.gov/servlets/purl/10159105>.
Y.C. Lai, et al., "Single-thread-based wearable and highly stretchable triboelectric nanogenerators and their applications in cloth-based self-powered human-interactive and biomedical sensing," Adv. Funct. Mater. 27 (2017) 1604462.
S. Choi, et al., "Recent advances in flexible and stretchable bioelectronic devices integrated with nanomaterials," Adv. Mater. 28 (2016) 4203-4218.
Y. Khan, et al., "Monitoring of vital signs with flexible and wearable medical devices," Adv. Mater. 28 (2016) 4373-4395.
X. Cao, et al., "Triboelectric nanogenerators driven self powered electrochemical processes for energy and environmental science," Adv. Energy Mater. 6 (2016) 1600665.
F.R. Fan, et al., "Flexible nanogenerators for energy harvesting and self-powered electronics," Adv. Mater. 28 (2016) 4283-4305.
W. Zeng, et al., "Fiber-based wearable electronics: a review of materials, fabrication, devices, and applications," Adv. Mater. 26 (2014) 5310-5336.
Q. Zhang, et al., "Green hybrid power system based on triboelectric nanogenerator for wearable/portable electronics," Nano Energy 55 (2019) 151-163.
K. Dong, et al., "A highly stretchable and washable all-yarn-based self-charging knitting power textile composed of fiber riboelectric nanogenerators and supercapacitors," ACS Nano 11 (2017) 9490-9499.

W. Gong, et al., "A wearable, fibroid, self-powered active kinematic sensor based on stretchable sheath-core structural triboelectric fibers," Nano Energy 39 (2017) 673-683.
X. He, et al., "A highly stretchable fiber-based triboelectric nanogenerator for self-powered wearable electronics," Adv. Funct. Mater. 27 (2017) 1604378.
A. Yu, et al., "Core-shell-yarn-based triboelectric nanogenerator textiles as power cloths," ACS Nano 11 (2017) 12764-12771.
J. Park, et al., "Flexible single-strand fiber-based wovenstructured triboelectric nanogenerator for self-powered electronics," Apl. Mater. 6 (2018) 101106.
M. Zhu, et al., "Highly shape adaptive fiber based electronic skin for sensitive joint motion monitoring and tactile sensing," Nano Energy (2020) 104429.
K. Dong, et al., "Fiber/Fabric-based piezoelectric and triboelectric nanogenerators for flexible/stretchable and wearable electronics and artificial intelligence," Adv. Mater. (2019) 1902549.
A. Joe Lopes, et al., "Integrating stereolithography and direct print technologies for 3D structural electronics fabrication," Rapid Prototyp. J. 18 (2012) 129-143.
E. Macdonald, et al., "3D printing for the rapid prototyping of structural electronics," IEEE Access 2 (2014) 234-242.
D. Espalin, et al., "3D Printing multifunctionality: structures with electronics," Int. J. Adv. Manuf. Technol. 72 (2014) 963-978.
M.S. Mannoor, Z. Jiang, T. James, Y.L. Kong, K.A. Malatesta, W.O. Soboyejo, N. Verma, D.H. Gracias, M.C. McAlpine, 3D printed bionic ears, Nano Lett. 13 (2013) 2634-2639.
Y.L. Kong, et al., "3D printed bionic nanodevices," Nano Today 11 (2016) 330-350.
J.Z. Gul, et al., "In situ UV curable 3D printing of multi-material tri-legged soft bot with spider mimicked multi-step forward dynamic gait," Smart Mater. Struct. 25 (2016) 115009.
D. Lei, et al., "4-Axis printing microfibrous tubular scaffold and tracheal cartilage application," Sci. China Mater. 62 (2019) 1910-1920.
S.Z. Guo, et al., "3D printed stretchable tactile sensors," Adv. Mater. 29 (2017) 1701218.
P. Laszczak, et al., "Development and validation of a 3D-printed interfacial stress sensor for prosthetic applications," Med. Eng. Phys. 37 (2015) 132-137.
Y. Tong, et al., "Low-cost sensor-integrated 3D printed personalized prosthetic hands for children with amniotic band syndrome: a case study in sensing pressure distribution on an anatomical human-machine interface (AHMI) using 3D-printed conformal electrode arrays," PloS One 14 (2019).
S. Chen, et al., "A single integrated 3D-printing process customizes elastic and sustainable triboelectric hanogenerators for wearable electronics," Adv. Funct. Mater. 28 (2018).
Y.L. Kong, et al., "3D printed quantum dot light-emitting diodes," Nano Lett. 14 (2014) 7017-7023.
M. Saari, et al., "Fiber encapsulation additive manufacturing: an enabling technology for 3D printing of electromechanical devices and robotic components," 3D Print. Addit. Manuf. 2 (2015) 32-39.
Y. Tong, et al., "A hybrid 3D printing and roboticassisted embedding approach for design and fabrication of nerve cuffs with integrated locking mechanisms," MRS Adv. 3 (2018) 2365-2372.
J.M. Murbach, et al., "In situ electrochemical polymerization of poly (3, 4-ethylenedioxythiophene)(PEDOT) for peripheral nerve interfaces," MRS Commun. 8 (2018) 1043-1049.
B.N. Johnson, et al., "3D printed anatomical nerve regeneration pathways," Adv. Funct. Mater. 25 (2015) 6205-6217.
B.N. Johnson, et al., "3D printed nervous system on a chip," Lab Chip 16 (2016) 1393-1400.
M. Singh, et al., "3D printed conformal microfluidics for isolation and profiling of biomarkers from whole organs," Lab Chip 17 (2017) 2561-2571.
K. Wang, et al., "Engineering electroactive dielectric elastomers for miniature electromechanical transducers," Polym. Rev. 57 (2017) 369-396.
K. Parida, et al., "Highly transparent, stretchable, and self-healing ionic-skin triboelectric nanogenerators for energy harvesting and touch applications," Adv. Mater. 29 (2017) 1702181.

(56) References Cited

OTHER PUBLICATIONS

S. Li, et al., "All-elastomer-based triboelectric nanogenerator as a keyboard cover to harvest typing energy," ACS Nano 10 (2016) 7973-7981.

S. Wang, et al., "Novel safeguarding tactile e-skins for monitoring human motion based on SST/ PDMS-AgNW-PET hybrid structures," Adv. Funct. Mater. 28 (2018) 1707538.

Z. Zhang, et al., "An air-cushion triboelectric nanogenerator integrated with stretchable electrode for human-motion energy harvesting and monitoring," Nano Energy 53 (2018) 108-115.

M.J. Taylor, et al., "Current state of hypothermic machine perfusion preservation of organs: the clinical perspective," Cryobiology 60 (2010) S20-S35.

Q. Zheng, et al., "Biodegradable triboelectric nanogenerator as a life-time designed implantable power source," Sci. Adv. 2 (2016), e1501478.

F. Yi, et al., "A highly shape-adaptive, stretchable design based on conductive liquid for energy harvesting and self-powered biomechanical monitoring," Sci. Adv. 2 (2016), e1501624.

M. Pawlaczyk, et al., "Age-dependent biomechanical properties of the skin," Adv. Dermatol. Allergol. 30 (2013) 302.

D. Eshmuminov, et. Al., "An integrated perfusion machine preserves injured human livers for 1 week," Nat. Biotechnol. (2020) 1-10.

T. Hueber, E.-L. Benaroya, et al., "Development of a silent speech interface driven by ultrasound and optical images of the tongue and lips," Speech Commun. 52 (2010) 288-300.

K. Brigham, et al., "Imagined Speech Classification with EEG Signals for Silent Communication: a Preliminary Investigation into Synthetic Telepathy," 4th iCBBE, 2010, pp. 1-4.

R. Liu, et al., "Shape memory polymers for body motion energy harvesting and self-powered mechanosensing," Adv. Mater. 30 (2018) 1705195.

J. Deng, et al., "Vitrimer elastomer-based jigsaw puzzle-like healable triboelectric nanogenerator for self-powered wearable electronics," Adv. Mater. 30 (2018) 1705918.

G. Costantino, et al., "Improvement of the adhesion of silicone to aluminum using plasma polymerization," J. Inorg. Organomet. Polym. 4 (1994) 425-430.

Y.C. Lai, et al., "Electric eelskin-inspired mechanically durable and super-stretchable nanogenerator for deformable power source and fully autonomous conformable electronic-skin applications," Adv. Mater. 28 (2016) 10024-10032.

* cited by examiner

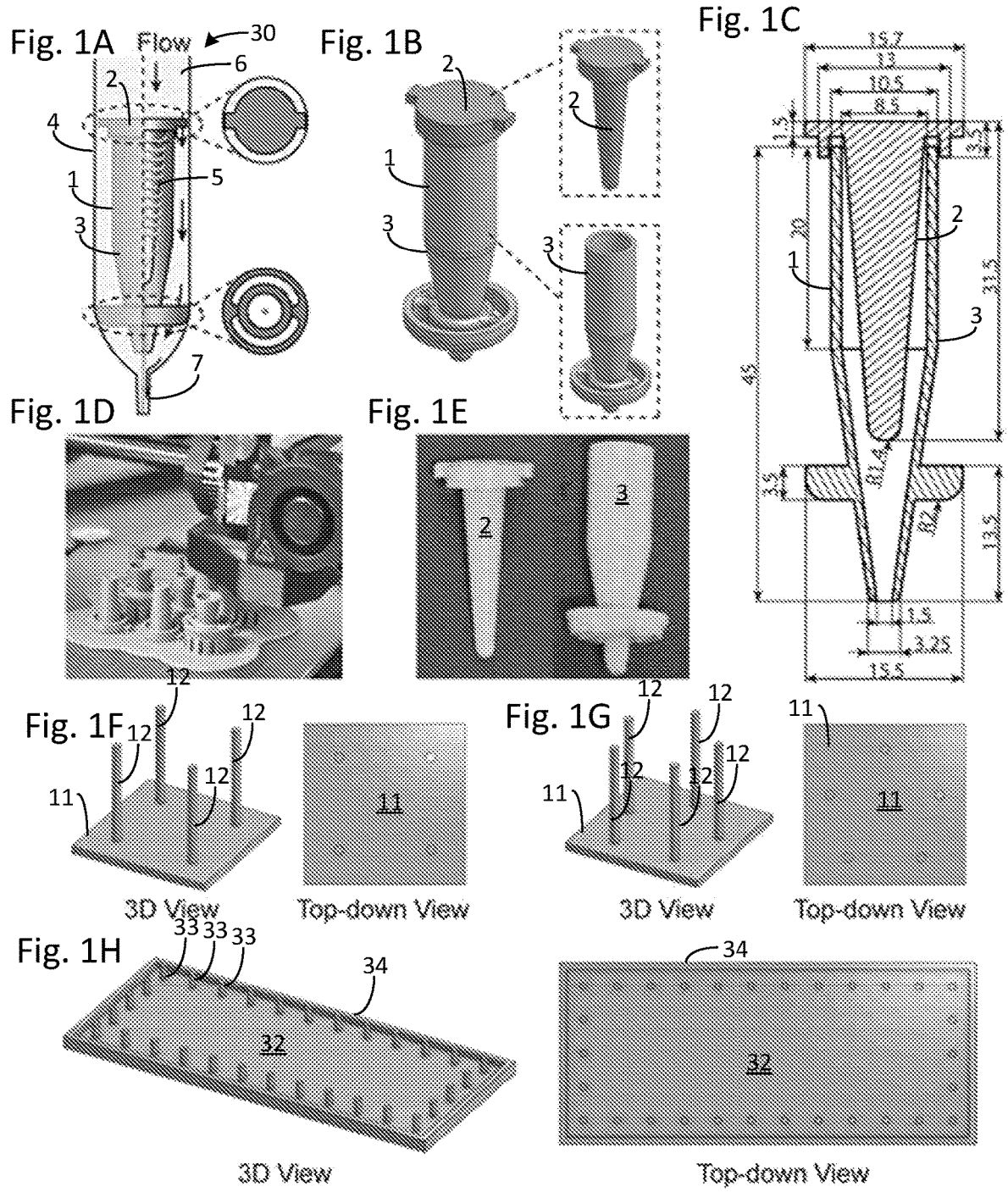

Fig. 2A  3D-printed Elastomeric Metal-core Fibers
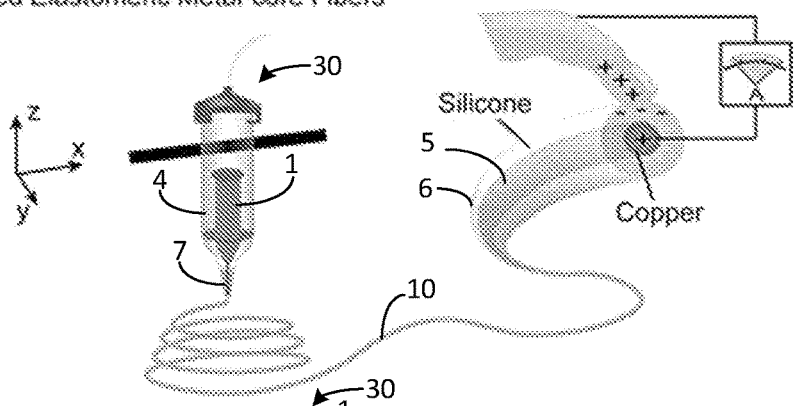
Fig. 2B  Coaxial Microextrusion
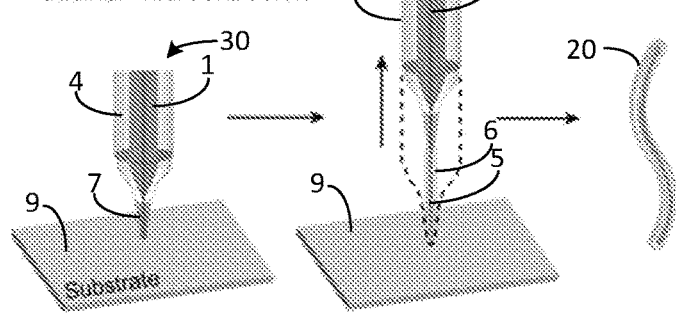
Fig. 2C
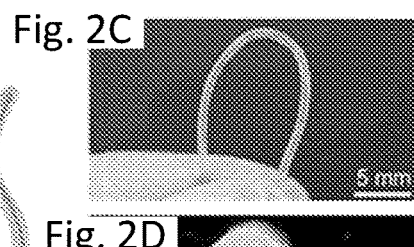
Fig. 2D
Fig. 2E  1D Printing of Hollow 3D Structures
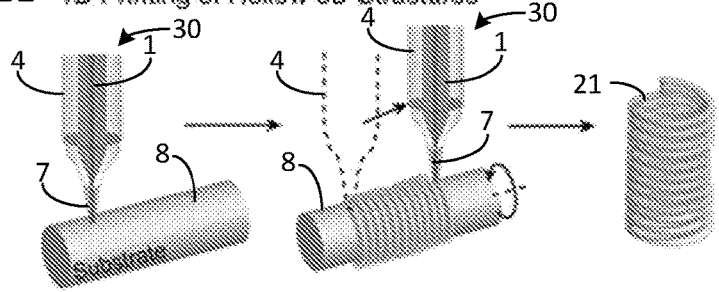
Fig. 2F   Fig. 2G
Fig. 2H
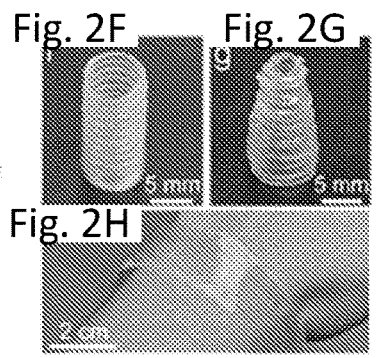
Fig. 2I  3D Printing of Customized 3D Structures
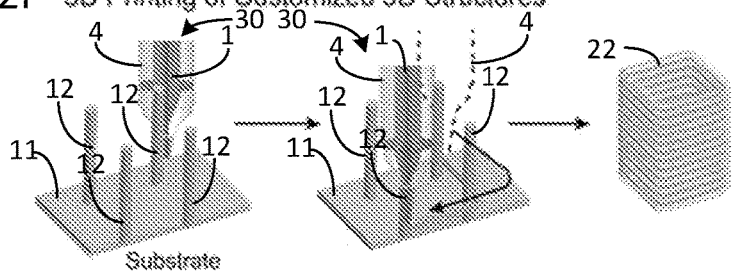
Fig. 2J   Fig. 2K
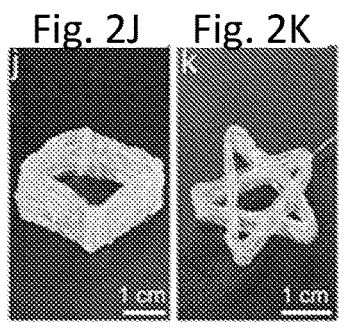

Fig. 3A  3D-printed Elastomeric Metal-core Fibers
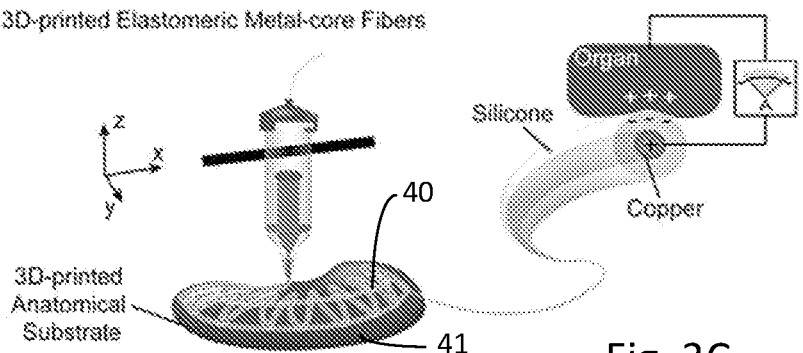
Fig. 3B
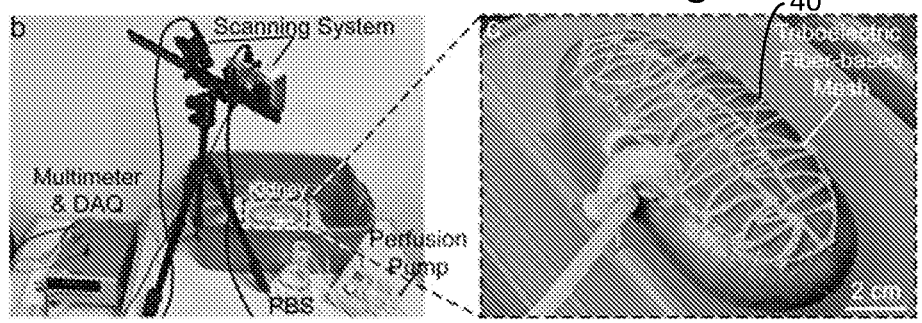
Fig. 3C
Fig. 3D
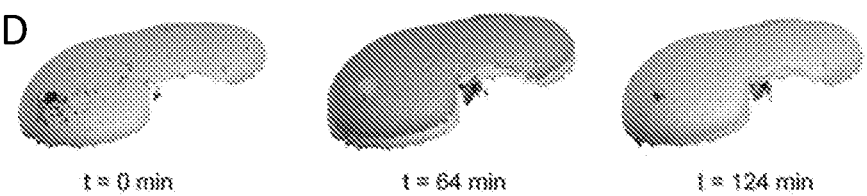
t = 0 min    t = 64 min    t = 124 min
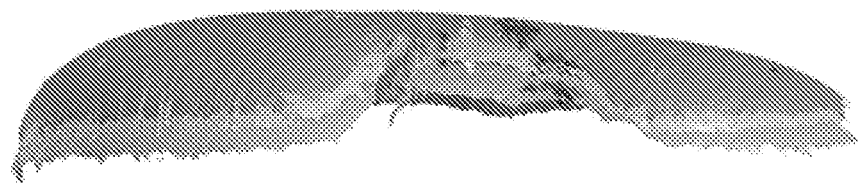
Fig. 3E
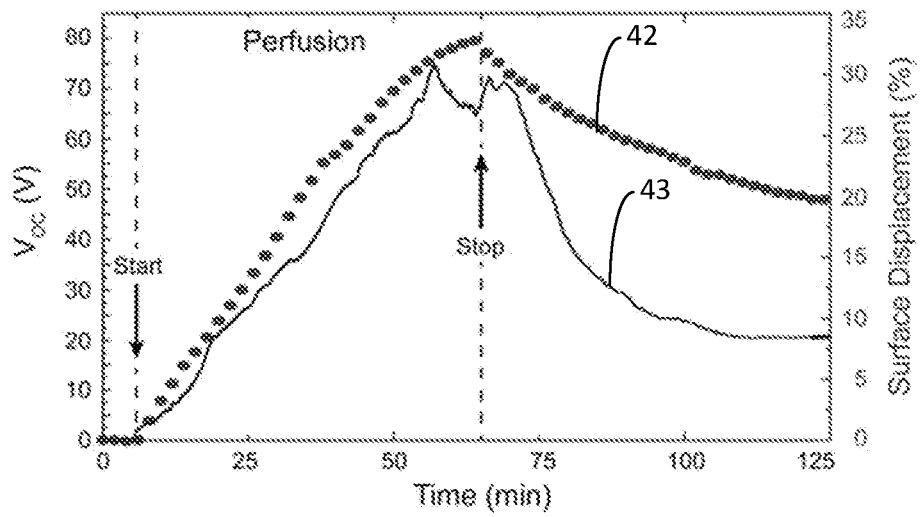

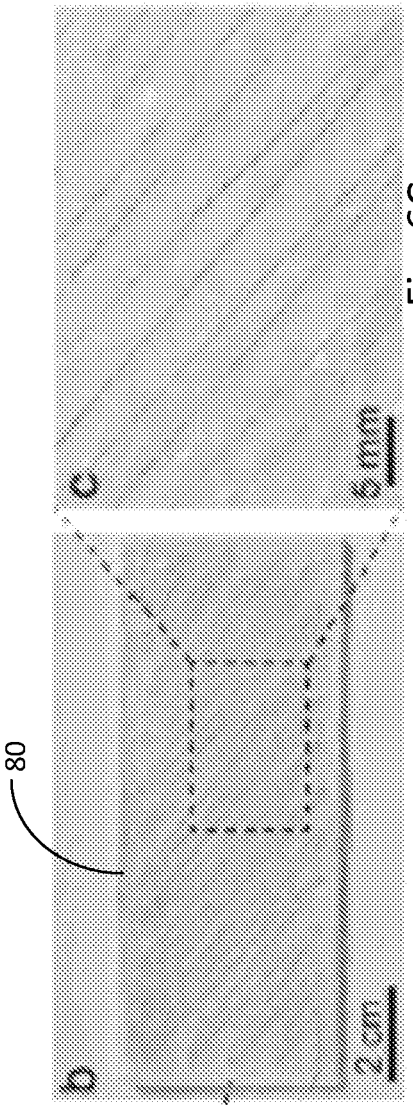
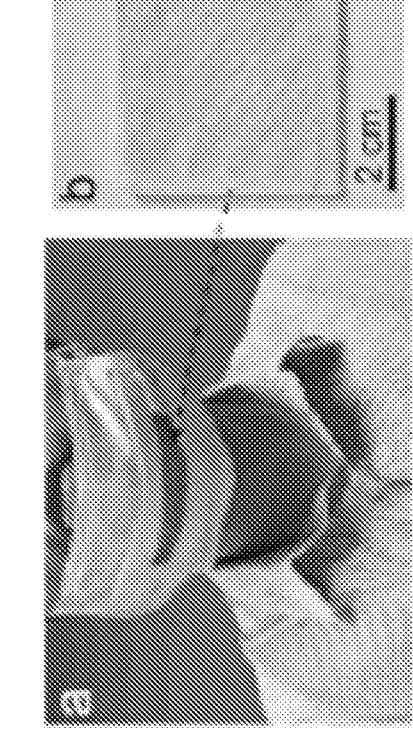
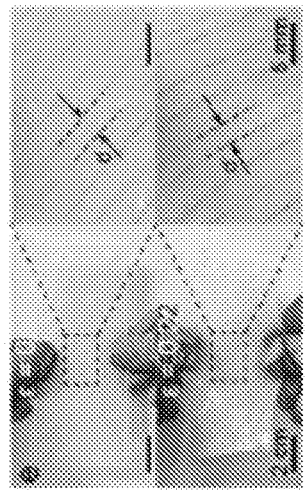
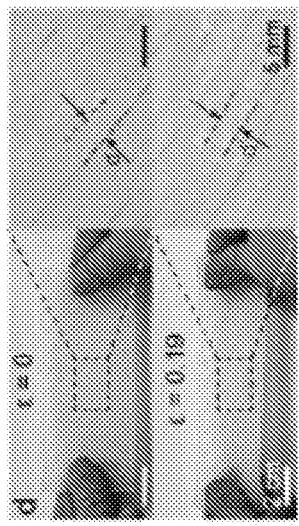

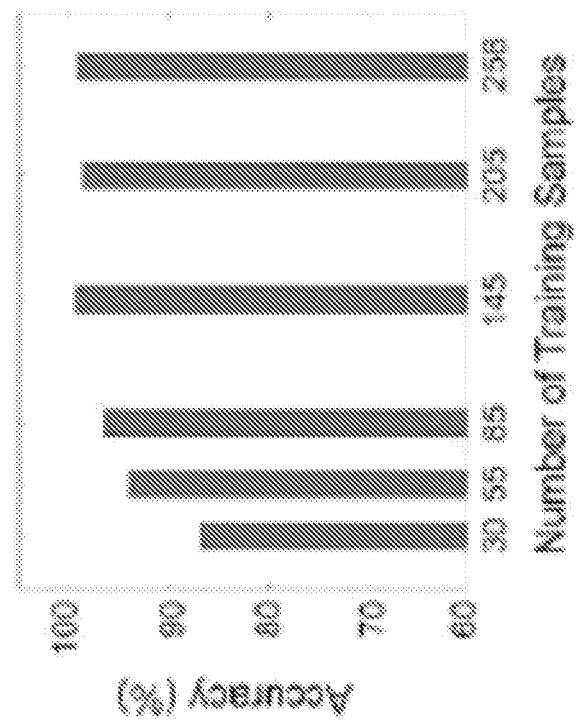
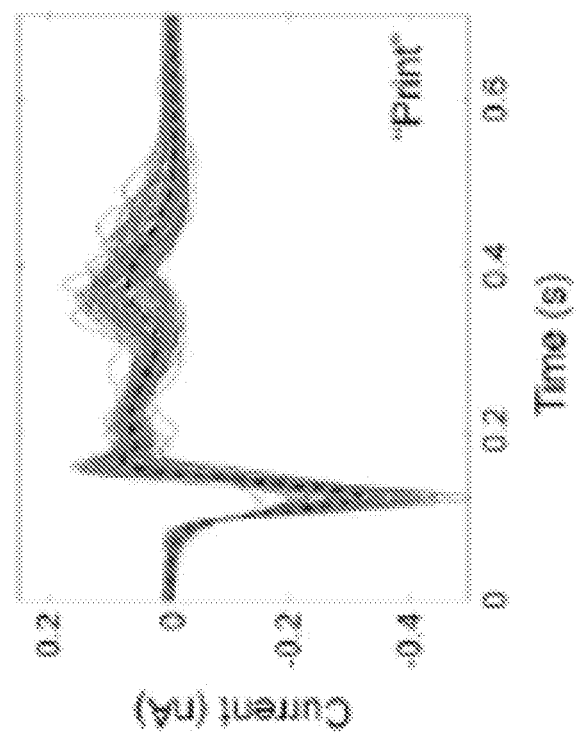
Fig. 6I
Fig. 6J

TABLE 1

| | Young's Modulus (MPa) | | UTS (MPa) | | Strain at Failure | |
|---|---|---|---|---|---|---|
| | | Ref. | | Ref. | | Ref. |
| TENG Membrane | 0.53 ± 0.07 | 0.44 MPa [3] | 0.25 ± 0.06 | 0.25 MPa [3] | 0.96 ± 0.04 | 1.5 [3] |

FIG. 11

THREE-DIMENSIONAL (3D)-PRINTABLE STRETCHABLE TRIBOELECTRIC NANOGENERATOR FIBERS

CROSS-REFERENCE TO RELATED APPLICATIONS

This application is a 35 U.S.C. § 371 national stage patent application of Patent Cooperation Treaty application number PCT/US2021/029350, filed Apr. 27, 2021, and titled "THREE-DIMENSIONAL (3D)-PRINTABLE STRETCHABLE TRIBOELECTRIC NANOGENERATOR FIBERS," which claims the benefit of and priority to U.S. provisional application No. 63/016,628, filed on Apr. 28, 2020, and entitled "THREE-DIMENSIONAL (3D)-PRINTABLE STETCHABLE TRIBOELECTRIC NANOGENERTOR FIBERS, DEVICES MADE THEREWITH, AND A METHOD OF 3D PRINTING THE FIBERS," the entire contents of both of which applications are hereby incorporated herein by reference.

GOVERNMENT RIGHTS STATEMENT

This invention was made with government support under Grant No. 1847436 awarded by the National Science Foundation. The government has certain rights in this invention.

TECHNICAL FIELD

The present disclosure discloses a 3D-Printable stretchable triboelectric nanogenerator fiber, devices made with the fibers and methods of 3D-printing the fibers.

BACKGROUND

The use of wearable electronics has grown substantially, owing to their promising applications, ranging from healthcare monitoring to communications. However, conventional power sources, such as, for example, rechargeable electrochemical batteries, impose limitations on device weight, size, and usage time, which delay the development and deployment of practical and sustainable wearable electronics. One promising path to overcome these limitations is self-powered electronic systems based on integrated energy-harvesting components. Triboelectric nanogenerators (TENGs) have gained considerable attention for their ability to convert mechanical to electrical energy, based on the triboelectric effect. A TENG converts mechanical energy produced by a small-scale physical change into electricity. The triboelectric effect (also known as triboelectric charging) is a type of contact electrification on which certain materials become electrically charged after they are separated from a different material with which they were in contact. Rubbing the two materials together increases the contact between their surfaces, causing the triboelectric effect to occur. For example, rubbing glass with fur, or a plastic comb through hair, can build up triboelectricity. Static electricity is typically triboelectric. The strength and polarity of the charges produced differ depending on a plurality of factors, such as the materials used, surface roughness of the materials, strain placed on the materials, and temperature.

The complexity of existing TENG fiber-based and fabric-based fabrication processes, which can involve multiple coating layers, deformation, and weaving with different types of conductive and dielectric materials, limits the material properties and form factors needed in many applications. Thus, new processes for the production and assembly of TENG fibers are needed that overcome these limitations to enable advanced triboelectric-based devices to be created, such as for rapid prototyping of form-fitting wearable systems.

Multi-material 3D printing processes have been leveraged extensively for the fabrication of structural electronics, bionics, and wearable devices. For example, stereolithography processes have enabled the fabrication of gaming pieces composed of polymer-embedded electronics, including light-emitting diodes (LEDs), microprocessors, accelerometers, and silver interconnects. Micro-extrusion 3D printing processes have allowed the fabrication of bionic tissues and active 3D electronics, such as tissues that contain integrated stretchable antennas and lenses containing integrated LEDs. However, the use of conductive and functional inks poses challenges to the design and fabrication of 3D-printed TENG fibers and triboelectric devices because of high cost, high-temperature post-processing steps (e.g., sintering), and poor mechanical properties, including limited flexibility and durability under cyclical loading.

Thus, it is desirable to expand the conductive and functional materials palette for 3D printing processes. To overcome the aforementioned limitations associated with the use of conductive and functional inks in electronics 3D printing, studies have been conducted to explore the feasibility of robotically interweaving high-quality drawn wires with 3D-printed constructs. For example, an integrated micro-extrusion 3D printing and pick-and-place process enabled the integration of platinum wires into silicone scaffolds, which was applied to the fabrication of custom-sized nerve cuffs. A Fused Deposition Modeling process with active wire integration capabilities was developed for encapsulating conductive metal wires in an extrudable matrix of styrene block copolymers. While important from the perspective of integrating high-quality wires (i.e., conducting materials) with 3D-printed constructs, the use of thermoplastics makes the process relatively unattractive from the perspective of fabricating triboelectric devices (e.g., because of their poor performance as triboelectrically-negative materials and limited elasticity). In contrast, silicone rubber, a widely 3D-printed material in micro-extrusion processes, has been widely recognized as a promising candidate for use in triboelectric systems, due to its high electronegativity and elasticity, which can generate a relatively large (and useful) charge upon contact with human skin through triboelectric effects. However, it is currently difficult to achieve wire encapsulation within elastomeric materials, such as silicone.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIGS. 1A-1H depict a custom wire-feed manifold in accordance with a representative embodiment being used in a 3D printing coaxial micro-extrusion system and process to 3D print elastomeric silicone-Cu TENG fibers on a printing substrate in accordance with a representative embodiment.

FIGS. 2A-2K depict a custom coaxial micro-extrusion 3D printing system and process used to fabricate elastomeric metal-core TENG fibers and devices and various TENG fibers and devices fabricated using the 3D printing system in accordance with a representative embodiment.

FIGS. 3A-3E depict a 3D-printed TENG fiber-based mesh mechanosensor for organ monitoring in accordance with a representative embodiment in which the mechanosensor is conformally printed on a porcine kidney.

FIGS. 6A-6J depict a 3D-printed TENG fiber mechanosensory configured for use in a silent speech application and measurement results obtained during an experiment in which a human subject silently mouthed different words.

FIG. 11 shows a table listing examples of mechanical properties that the TENG fiber-based membranes can have obtained from tensile testing studies (Young's modulus and UTS).

DETAILED DESCRIPTION

Figure 4:
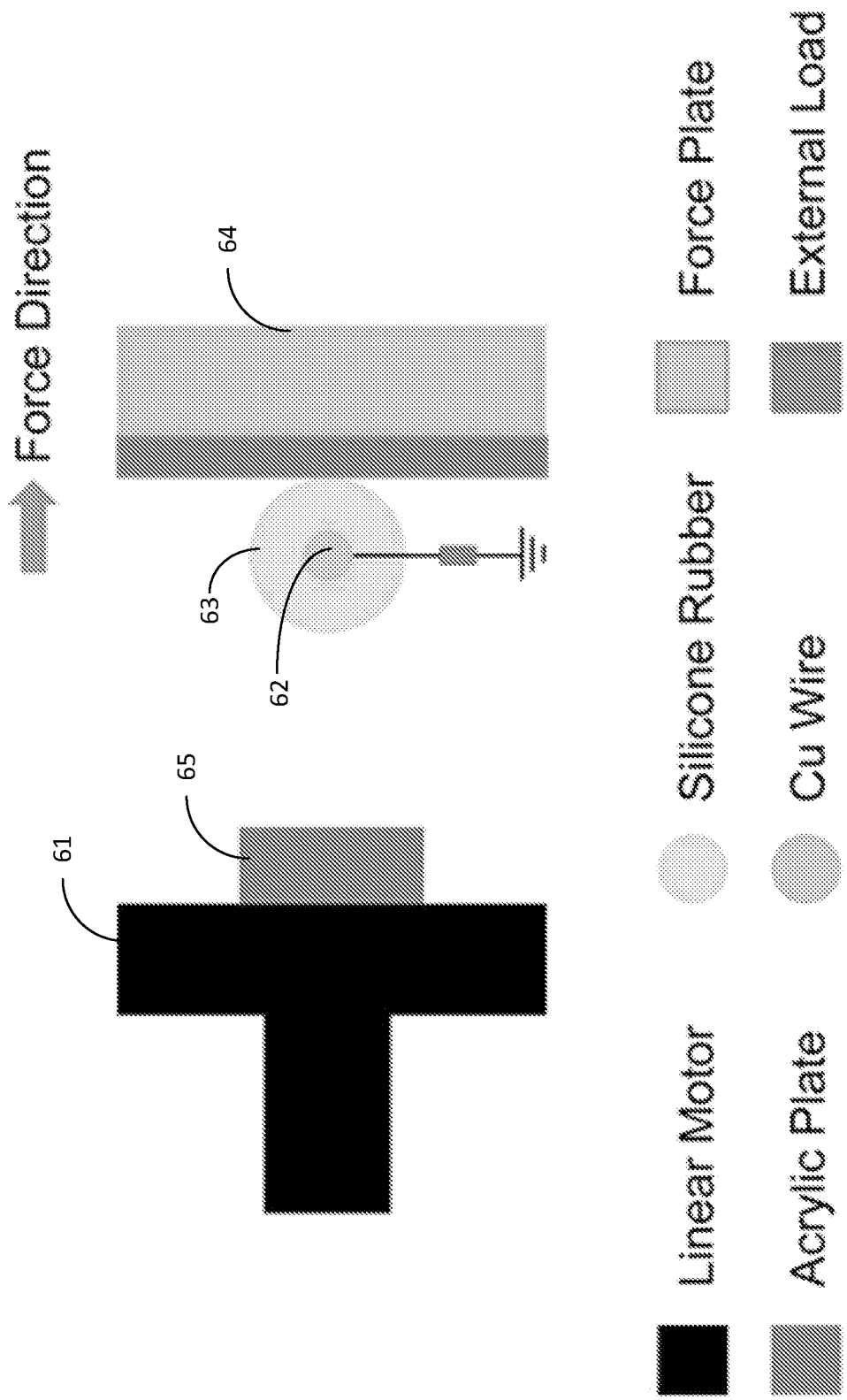
FIG. 4 is a schematic diagram of a dynamic loading configuration for characterizing the triboelectric performance of 3D-printed Silicone-Cu TENG Fibers fabricated in accordance with a representative embodiment.

The present disclosure demonstrates the utility of flexible TENG fiber and 3D printing processes through applications of wearable mechanosensors for organ and human activity monitoring, e.g., monitoring of perfused organs and speech recognition in the absence of sound production by the speaker. The latter application is referred to herein as "silent speech." 3D-printed mechanosensors, in the form of anatomical organ-conforming meshes, are disclosed herein for real-time monitoring of perfusion-induced kidney edema, a serious problem encountered in organ preservation and transplantation. 3D-printed self-powered wearable mechanosensors, in the form of stretchable membranes, enable speech recognition in the absence of sound production through image-based facial expression monitoring of the speaker's facial expressions.

These prototypic applications discussed herein demonstrate that 3D-printed elastomeric metal-core, silicone-copper (Cu) TENG fibers can provide the basis for development of high-performance triboelectric devices across a range of applications, including healthcare and human behavior monitoring, such as real-time monitoring of pain and "silent speech." It will be understood by those of skill in the art that the inventive principles and concepts are not limited to the applications and examples described herein.

A fabrication process is disclosed herein for the production of flexible, elastomeric TENG fibers, which, in accordance with a representative embodiment, are fibers comprising a copper core surrounded by a silicone cladding. However, other metals and elastomeric materials can be used for the core and the cladding, respectively. In accordance with a representative embodiment, the TENG fibers are fabricated using a coaxial micro-extrusion process. Fabrication of 2D and 3D constructs that incorporate the fibers via 3D printing is demonstrated herein, on both stationary and moving substrates, including membranes, meshes, and hollow 3D structures with capacitor charging and powering of LEDs.

In the following detailed description, a few illustrative, or representative, embodiments are described to demonstrate the inventive principles and concepts. For purposes of explanation and not limitation, representative embodiments disclosing specific details are set forth in order to provide a thorough understanding of an embodiment according to the present disclosure. However, it will be apparent to one having ordinary skill in the art having the benefit of the present disclosure that other embodiments that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices. Relative terms may be used to describe the various elements' relationships to one another, as illustrated in the accompanying drawings. These relative terms are intended to encompass different orientations of the device and/or elements in addition to the orientation depicted in the drawings. It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

Materials and Methods: In the following discussion, copper and silicone were used for the core and the surrounding cladding, respectively, of the TENG fibers. As indicated above, however, other electrically-conductive materials and elastomeric materials may be used for the core and surrounding cladding, respectively. For the examples described herein, the silicone that was used was SI 595 CL from Loctite and the Cu wire (bare uninsulated, 36 AWG) that was used was from WesBell Electronics, Inc. The glass pins that were used (extra fine) were from Dritz. Polylactic acid 3D printing filament (PolyLite) from Polymaker was used. Phosphate-buffered saline (PBS) from Sigma Aldrich was used. Ultrapure deionized water (DIW) from a commercially-available DIW system (Direct-Q 3UV; Millipore) was used.

Customized manifolds design: Customized manifolds for 3D printing of elastomeric metal-core TENG fibers were designed with a computer-aided design (CAD) software. With reference to FIGS. 1A-1H and a representative embodiment, for this example, each manifold 1 was designed as a hollow two-part structure, with top and bottom portions 2 and 3, respectively, of the manifold 1 serving as a source of, respectively, wire 5 (core material) and die 6 for passive wire feeding based on drag extruded silicone that surrounded the wire. The bottom portion 3 of the manifold 1 also served to provide structural integration with the surrounding dispensing barrel 4 in which the elastomer 6 was contained.

An example of the 3D design and engineering drawing of the customized manifold is shown in FIGS. 1B and 1C, although many variations can be made to the manifold 1 within the inventive principles and concepts described herein, as will be understood by those of skill in the art in view of the description provided herein. The dimensions shown in FIG. 1C are suitable for this example, but the inventive principles and concepts are not limited to these dimensions, as will be understood by those of skill in the art. FIG. 1D is a photograph of a plurality of the manifolds 1 having various dimensions and shapes. For these examples, the manifolds 1 were fabricated using a commercially-available desktop 3D printer (LulzBot mini 2; LulzBot) using vendor-provided slicing software (Cura; LulzBot) and protocols (see FIGS. 1D and 1E).

Coaxial multi-material micro-extrusion 3D printing processes metal-core fibers: With reference to FIGS. 2A-2K, in an example, the elastomeric metal-core TENG fibers 10, and devices 20-22 fabricated with the fibers 10, were made using a custom coaxial micro-extrusion 3D printing system. For the representative embodiments and examples discussed herein, the 3D printing system comprised a three-axis robot (MPS75SL; Aerotech), a digital pressure regulator (Ultimus V; Nordson), a motion controller (A3200; Aerotech), and coaxial extrusion nozzle 7 (i.e., dispensing barrel-manifold assembly), although the inventive principles and concepts are not limited with respect to the type of 3D printing system that is used or its configuration. Cu wire 5, which served as the metallic core material, was first loaded on the top portion 2 of the manifold 1. The preloaded manifold 1 was then transferred into a dispensing barrel 4 (e.g., 10 cc; Nordson EFD) having a tapered tip (e.g., 18-gauge tapered tip). Silicone 6, which served as the elastomeric cladding material in this example, was subsequently loaded in the coaxial extrusion barrel 4. Prior to printing, the metal core 5 was anchored on the substrate 9 by locally curing the cladding (FIG. 1E). In this example, TENG fibers 10 were printed by continuous extrusion of the silicone 6 using a pressure of 15 psi at a constant vertical feed rate of 2 mm $s^{-1}$. Following printing, the fibers 10 were cured at room temperature.

With reference to FIGS. 2E-2G, hollow 3D structures (e.g., cylinders and cones) 21 and 22 were fabricated by fiber 3D printing on continuously rotating glass mandrels 8 (radius=3 mm; frequency=45 RPM) using a 16-gauge tapered tip and extrusion pressure of 20 psi. For this example, following anchoring of the core material to the stationary mandrel 8 (FIG. 2E), the structures 21 were fabricated by fiber 3D printing with linear horizontal motion along the axial dimension of the mandrel in the presence of continuous mandrel rotation at 0.7-2.0 mm $s^{-1}$. With reference to FIG. 2H, wristbands were fabricated by fiber 3D printing on a rotating polylactic acid mandrel (radius=70 mm; frequency=45 RPM) using a 16-gauge tapered tip, extrusion pressure of 55 psi, and printing speed of 1.4 mm $s^{-1}$. It should be noted that the inventive principles and concepts are not limited to any particular 3D printing conditions, parameters, variables or materials. The printed structures 21-22 were cured overnight prior to release from the mandrels 8.

With reference to FIGS. 2I-2K, cuboid- and star-shaped 3D structures 22 were fabricated on planar, stationary 3D-printed substrates 11 that exhibited four and five anchoring pins 12, respectively (examples of pin patterns are shown in FIGS. 1F and 1G). Substrates were designed using commercially-available CAD software and a desktop 3D printer (Onshape and LulzBot mini 2, respectively) using vendor-provided slicing software (Cura; LulzBot) and protocols (FIGS. 1E-1H). The structures were 3D printed using an 18-gauge tapered tip, extrusion pressure of 15 psi, and printing speed of 2 mm $s^{-1}$ using a custom tool path. Changes in fiber trajectory during 3D printing were facilitated by fiber interweaving among the substrate anchoring pins by manual toolpath programming. The printed structures were cured overnight prior to release them from the substrates.

With reference to FIG. 1H, TENG fiber-based membrane sensors for silent speech studies were printed on a planar substrate 32 that contained a 50×120×3 $mm^3$ cavity and thirty anchor pins 34 around its edge 34 using a 18-gauge tapered tip, extrusion pressure of 15 psi, and printing speed of 2 mm $s^{-1}$. The toolpath comprised a zig-zag pattern with a 45-degree inclination relative to the substrate edge 34. An additional layer of silicone was printed on top of the patch to smoothen the surface. The printed structures were cured overnight prior to release them from the substrates.

With reference to FIGS. 3A-3E, an example is shown of a TENG fiber-based mesh sensor 40. The sensor 40 was made for organ monitoring studies, and was conformally printed on 3D-printed models 41 of porcine kidneys. For this example, conformal tool paths were manually programmed based on uniform mesh geometry that spanned the bottom half of the kidney models 41. Glass pins were mounted to the kidney model 41 to provide fiber anchor points within the non-planar tool path. Printing was performed using an 18-gauge tapered tip, extrusion pressure of 15 psi, and printing speed of 2 mm s$^{-1}$. The printed structures (FIG. 3B) were cured overnight prior to release them from the substrates.

Characterization of 3D-printed TENG fibers and devices: FIG. 4 is a schematic diagram of a dynamic loading configuration for characterizing the triboelectric performance of 3D-printed Silicone-Cu TENG Fibers. With reference again to FIG. 4, the active material was driven by a linear motor (LinMot E1200) 61 in the cyclic loading tests. Fibers and wristbands comprising the Cu core 62 and the Silicone cladding 63 were evaluated while clamped on a force plate (Vernier FP-BTA) 64. The applied load was controlled using a sensor console (LabQuest 2) and software (Logger Pro). Commercial acrylic plates (McMaster-Carr) 65 were applied as moving materials. The moving frequency and contact force were maintained at 8 Hz and 50 N by the linear motor 61.

A programmable electrometer (Keithley 6514) was used to measure the short-circuit current, open-circuit voltage, transferred charge, and current in the quantitative electrical output and the self-powered sensors studies. The data were exported in real-time by a data acquisition card (National Instrument USB-6211), LabVIEW and Matlab.

Figure 5:
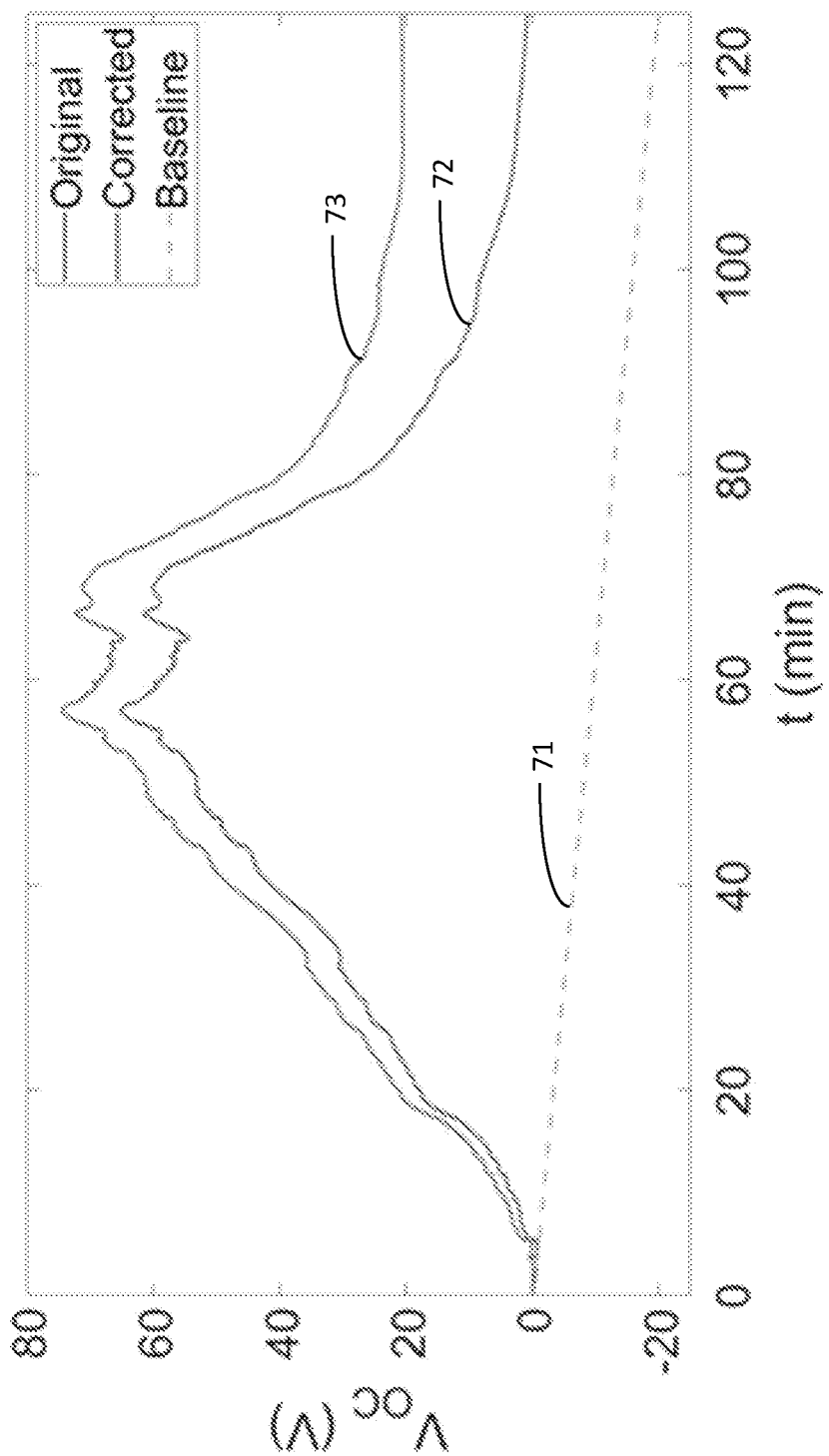
FIG. 5 is a plot showing a baseline curve, the original sensed output voltage and the corrected output voltage as a function of time for the sensor shown in FIG. 3C.

Characterization of perfusion-induced organ edema via real-time monitoring of 3D-printed TENG fiber-based devices: With reference again to FIGS. 3B-3E, adult porcine kidneys were obtained from a local abattoir in strict accordance with good animal practice as defined by the relevant national and local animal welfare bodies, and approved by Virginia Tech. The kidneys were dissected from the detached viscera and stored in an insulated container during transportation to the experiment site. The transportation time was 2 hours. Prior to machine perfusion, residual fat tissue around the organ was removed. The renal artery of the kidney was subsequently anastomosed to plastic tubing (7 mm diameter). The system tubing was then connected in series with a variable-speed peristaltic pump (Cole-Parmer) and feed reservoir that contained a PBS solution. Organ mechanosensing was done using 3D-printed TENG fiber-based mesh placed under the kidney, separated by a thin layer of insulating material (Parafilm). Data acquisition began five minutes prior to activating the perfusion process (i.e., initiating the flow of PBS solution) to establish an initial baseline in the sensor response. Subsequently, the kidneys (n=3) underwent normothermic perfusion for 1 hour in a single-pass flow mode using room temperature PBS solution as the perfusate at a flow rate of 7.8 mL min$^{-1}$. Following the 1-hour perfusion interval, the perfusate flow was stopped (FIG. 3E) and the sensor response was continuously monitored for the next hour. Raw sensor data has been corrected by subtracting the baseline variation, in which the baseline was determined by the curve fitting of data acquired during the first five minutes. FIG. 5 is a plot showing the baseline curve 71, the original sensed output voltage 72 and the corrected output voltage 73 as a function of time for the sensor shown in FIG. 3C.

Characterization of perfusion-induced organ edema via real-time monitoring of 3D organ surface displacement: Perfused kidneys were continuously imaged from a top-down perspective over the course of the perfusion process using a single camera-projector structured-light scanning system (FIG. 3B; HP 3D Structured Light Scanner Pro S3). The system was calibrated in advance following vendor-provided protocols using a 60 mm calibration grid. Scans were collected every two minutes throughout the perfusion process, which resulted in a set of point clouds that quantify the out-of-plane displacement of the kidney during perfusion. The transient displacement was calculated as the distance between the first scan and subsequent scans. Quantification of the separation distance between two point clouds was performed using a commercially-available 3D CAD modeling software (Rhino 6; Rhinoceros). Specifically, a point object (P) was manually created above the point clouds ($S_i$), which marked the location of the midpoint of the organ in the x- and y-axes based on top-down projection. Following projection of the same point on each scan using the Project command (i.e., the projection of point P on scan $S_i$ resulted in the point $P_i$), the absolute organ surface displacement (d) of scan $S_i$ was then defined as the distance between the projected point $P_i$ and $P_0$, where $P_0$ is the projection of point P on the initial scan $S_0$. The initial organ surface level (h) was defined as the distance between $P_0$ and the height of the substrate on which the organ was resting as identified from the scanning data. Thus, the relative surface displacement was calculated as the ratio of the absolute height change to the original height $$\left(\text{i.e., } \frac{d}{h} \times 100\%\right).$$

As discussed below in more detail with reference to FIGS. 3A-3E, these measurements were compared with the response of the triboelectric sensor to determine the accuracy of the response of the sensor.

Figure 6F:
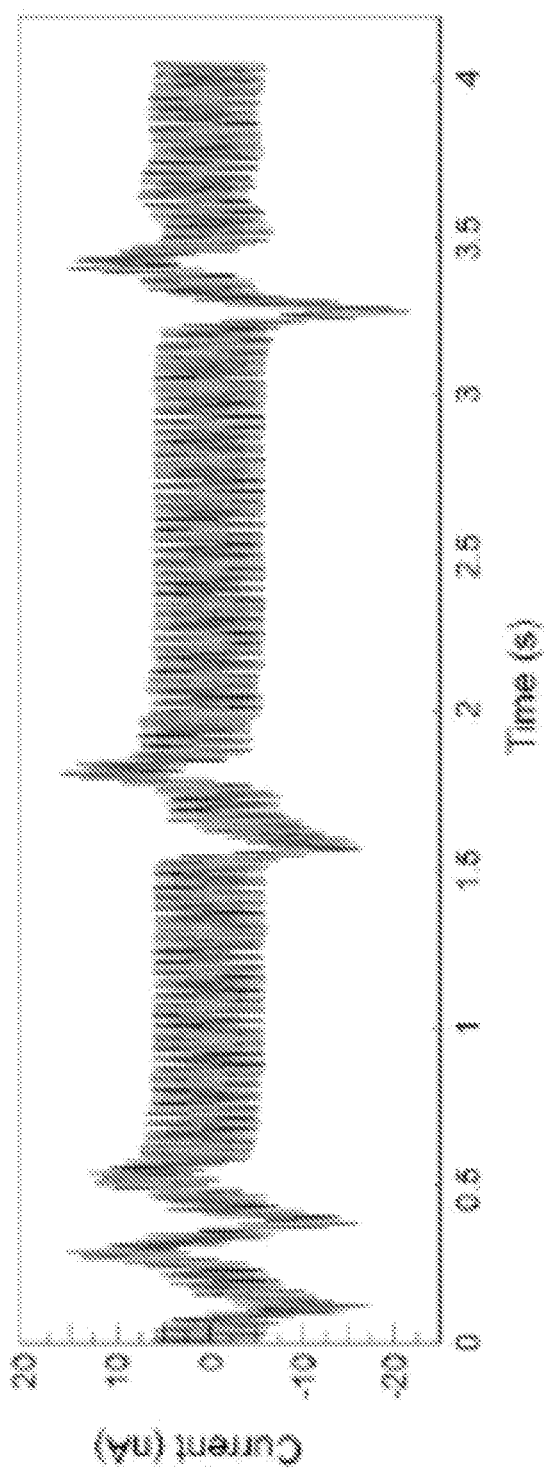
Figure 6G:
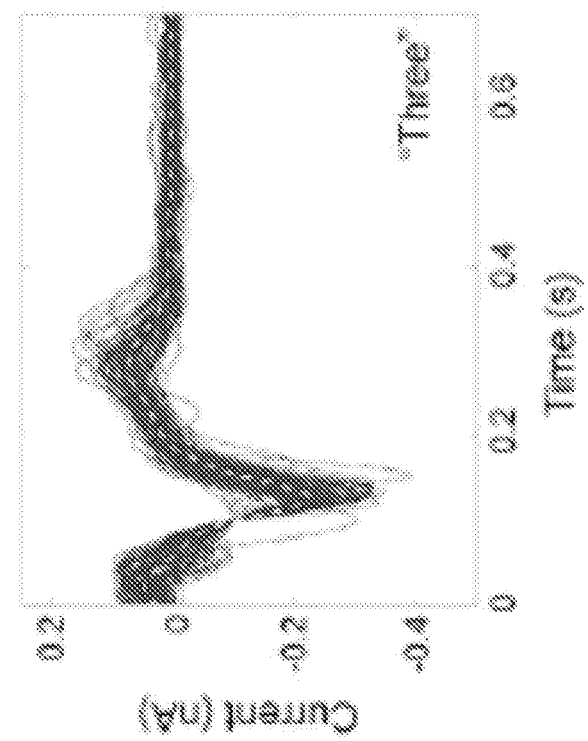
Figure 6H:
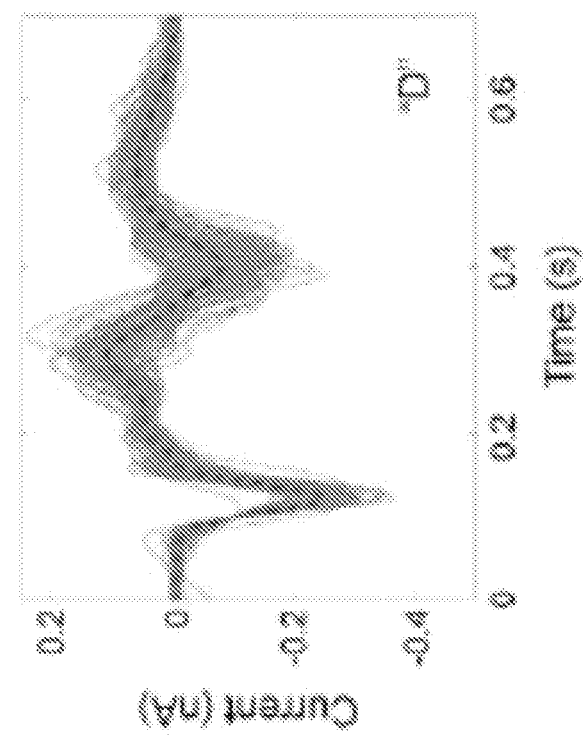

Real-time silent speech: With reference to FIGS. 6A-6J and 7, studies associated with silent speech recognition were conducted using 3D-printed TENG fiber-based membranes affixed to the user's face using a surgical mask. FIG. 6A is a photograph of a human subject wearing the triboelectric membrane-integrated facemask. FIG. 6B is a photograph of the stretchable TENG fiber-based membrane's integrated transduction elements (TENG fibers) 80 with a zoomed view shown in FIG. 6C. FIGS. 6D and 6E demonstrate the orthogonal stretchability of the TENG fiber-based membrane with zoomed views showing fiber orientation in the absence and presence of strain. FIG. 6F is a plot of electrical current as a function of time for raw sensor data generated by the worn triboelectric device 80 during silent speech. FIGS. 6G-6I show the filtered and averaged (dotted line) triboelectric responses of the device 80 corresponding to silently speaking the number "three," the letter "D," and the word "print", respectively. FIG. 6J is a plot of speech detection accuracy vs. the number of training samples for an online classification system for different training sample sizes.

Figure 7:
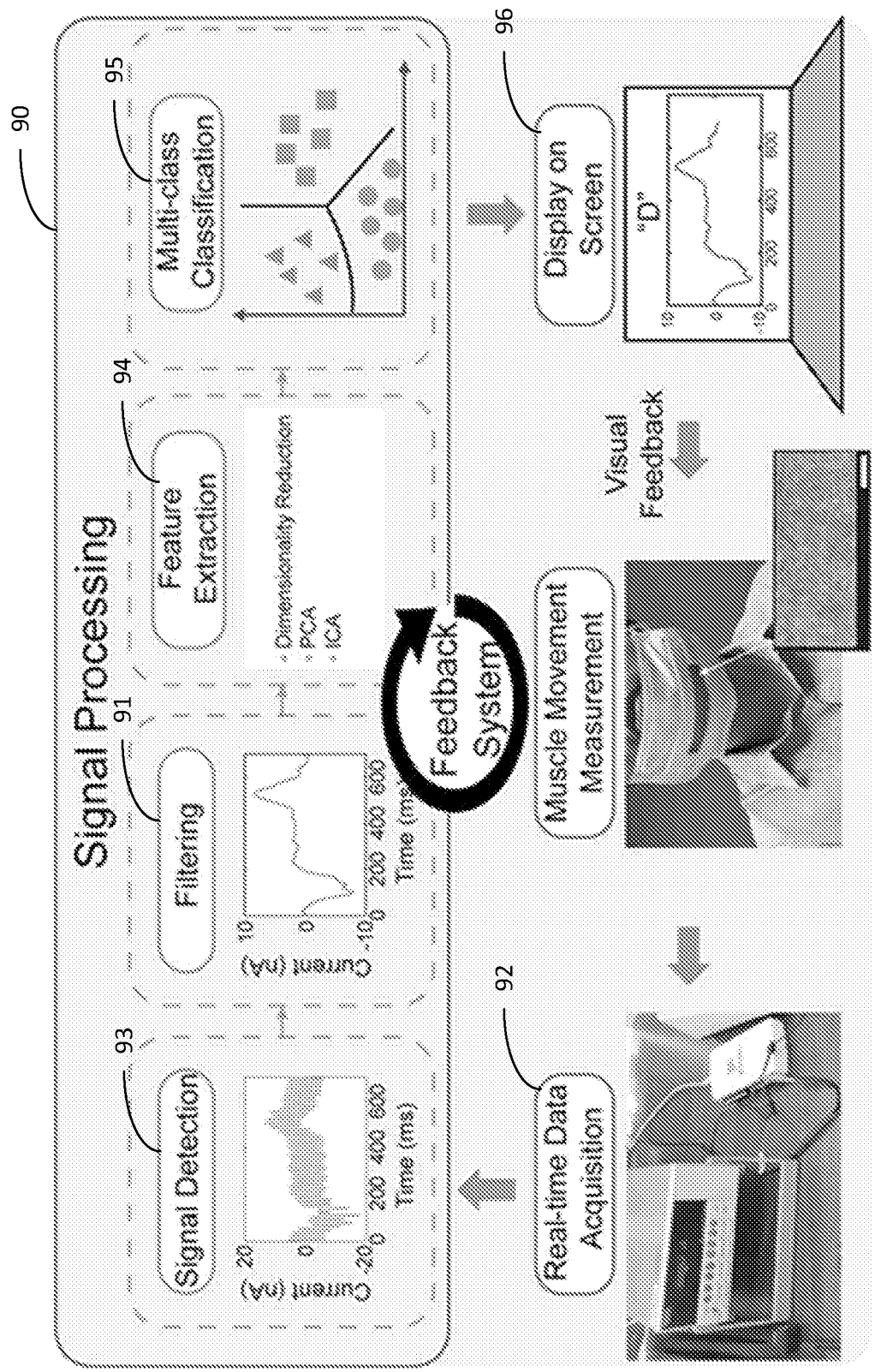
FIG. 7 shows a block diagram of the system in accordance with a representative embodiment for performing the silent speech algorithm depicted in FIGS. 6A-6J.
Figure 8A:
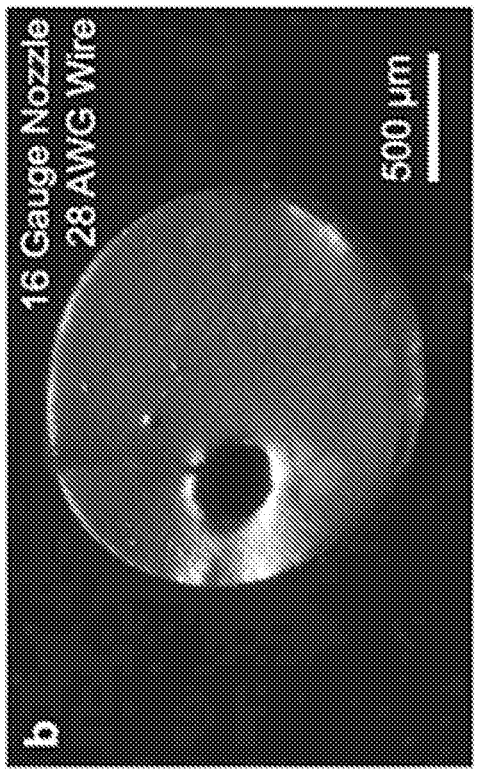
FIGS. 8A-8D are cross-sectional scanning electron micrographs of fibers printed with varied core-shell sizes.
Figure 8B:
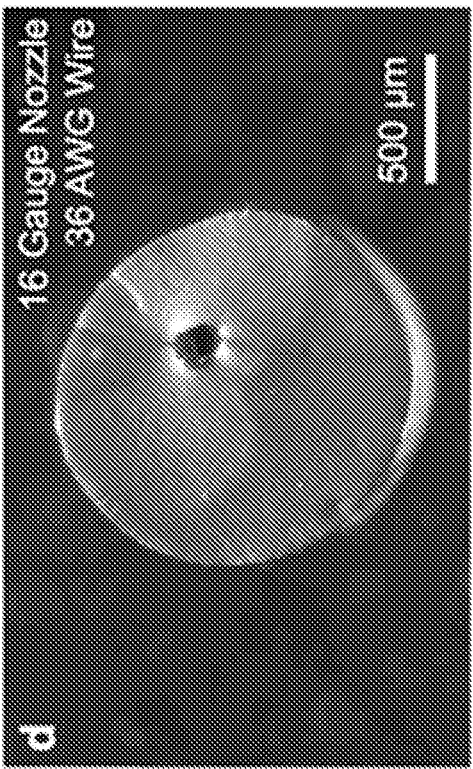
Figure 8C:
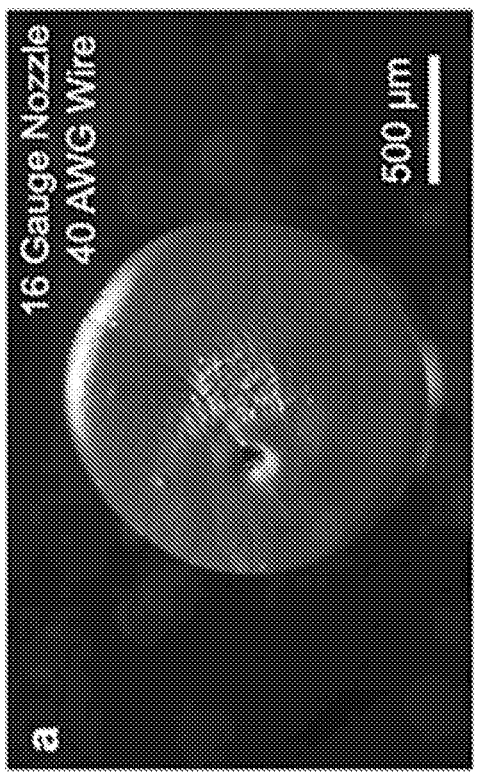
Figure 8D:
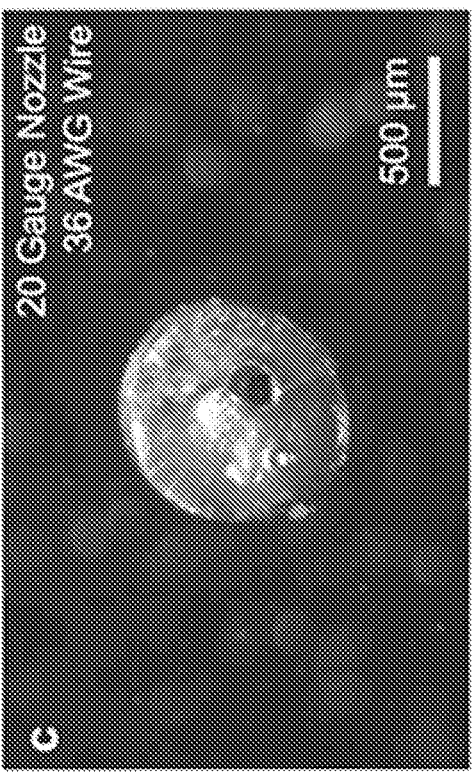

FIG. 7 shows a block diagram of the system 90 in accordance with a representative embodiment for performing the silent speech algorithm in accordance with a representative embodiment. For the silent speech studies, the participant said the number "three," the letter "D," or the word "print" silently (i.e., performing the physical act of speaking but without sound production) during which the short-circuit current ($I_{SC}$) of the membrane was continuously monitored. The participant remained still and silent with a neutral facial expression at other times throughout the experiment. An anti-aliasing filter (FIG. 7, block 91) was designed to filter out signals above the Nyquist frequency (500 Hz). Custom Matlab scripts provided communication with the data acquisition card (FIG. 7, block 92) to obtain real-time electrical signals. $I_{SC}$ signals associated with the user's facial muscle movements were detected using a threshold method (FIG. 7, block 93). The thresholds were determined by the frequency-domain noise level. For this example, measurements were acquired at a sampling rate of 1000 Hz. Acquired signals were digitally filtered with a band-pass filter (e.g., 0.1 to 20 Hz) and a notch filter (e.g., at 60 Hz and its harmonics). The notch filter was added to provide additional filtering from 60 Hz noise associated with power outlets.

In accordance with a preferred embodiment, the silent-speech recognition algorithm includes a machine learning algorithm, as represented in FIG. 7 by the feature extraction and multi-class classification blocks 94 and 95, respectively. The system 90 can include a display device 96 for displaying the silent speech results. To train the machine learning algorithm, the dimensionality of the filtered signal was first reduced via Principal Component Analysis (PCA) and Individual Component Analysis (ICA). Depending on the subject's jaw shape and muscle movements, varying effectiveness of the dimensionality reduction was observed. If the accuracy of prediction increased by 1% or greater, the dimensionality reduction step was utilized in the training algorithm. To obtain the classifier coefficients, various supervised learning methods were implemented and the accuracy rates were compared. The methods included linear and quadratic discriminant analysis, linear, quadratic, and Gaussian support vector machine, and K-nearest Neighbor models. In the real-time feedback system, the machine learning model that exhibited the highest degree of accuracy in the training algorithm was used.

Finite element simulations: Simulations of the triboelectric effect for the silicone-Cu system were performed using a commercially available finite element modeling software (COMSOL Multiphysics). The charge density on the silicone top surface was set at $-2$ $\mu C$ $m^{-2}$. The electrical potential was investigated with different distances from 0 to 1 mm with a step size of 0.1 mm. The external conductive object (top) was set as the ground.

The computer algorithms represented by blocks 91-96 in FIG. 7 can be performed in hardware, software and/or firmware, or a combination thereof. The computer algorithms are typically performed on software or firmware executed by one or more processors. The system 90 will typically comprise one or more processors that execute one or more software computer programs for performing the data acquisition, signal detection, filtering, feature extraction and multi-class classification algorithms 91-95, respectively. The software computer program(s) are stored in one or more memory devices that are nontransitory computer-readable mediums. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

Any software component stored in memory are executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion, component or type of memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, RAM, ROM, hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

3D printing processes: With reference again to FIG. 2A, a coaxial multi-material micro-extrusion process enabled 3D printing of elastomeric metal-core triboelectric fibers. Cu wire 5 and silicone 6 served as the metal core and elastomeric cladding, respectively. Elastomeric metal-core silicone-Cu fibers provide attractive materials for creating self-powered wearable triboelectric devices, based on current generated by electron transfer from proximity to or mechanical contact with biological tissue, such as skin. Coaxial micro-extrusion of elastomeric silicone-Cu fibers involved a custom wire-feed manifold 1 (FIGS. 1A-1E) that enabled passive wire drawing through terminal anchoring of the fiber on the printing substrate 9, 8, 11. The micro-extrusion nozzle 7 served as the extrusion die and provided wire alignment and encapsulation within the elastomeric cladding. Examples of the design and fabrication details associated with the custom manifold 1 in accordance with a representative embodiment are shown in FIGS. 1A-1E.

As shown in FIG. 2B, continuous extrusion of silicone 6 in combination with continuous vertical motion of the extruder (i.e., vertical 3D printing) resulted in the production of metal-core elastomeric silicone-Cu fibers 20. A photograph of the 3D-printed silicone-Cu fiber 20 and micrograph of the fiber cross-section are shown in FIGS. 2C and 2D, respectively. As shown in FIG. 2C, the 3D-printed silicone-Cu fibers can be highly flexible, due to the low bending modulus of the Cu wire and the high elasticity of the silicone cladding. The fiber diameter (840±8 µm) reasonably approximates the nozzle inner diameter (838 µm), indicating a minimal die-swell effect during extrusion. In addition to fiber 3D printing on planar stationary substrates 9, 11, elastomeric metal-core fibers were also 3D printed on continuously rotating substrates 8. As shown in FIG. 2E, fiber printing on continuously rotating mandrels 8 enabled the fabrication of 3D hollow structures, including cylinders and cones (FIGS. 2F and 2G, respectively). The process was scalable through modification of the mandrel 8 diameter, thus enabling the fabrication of wearable systems, including wristbands (FIG. 2H). As shown in FIG. 2I, the process also enabled the fabrication of 3D constructs on planar stationary substrates 11 that contained distributed anchor pins 12, including cuboid- and star-shaped structures (FIGS. 2J and 2K, respectively).

The process also offered control over the fiber and core diameters. FIGS. 8A-8D are cross-sectional scanning electron micrographs of fibers printed with varied core-shell sizes. For example, elastomeric metal-core silicone-Cu fibers were fabricated across a range of outer fiber diameters from 510 to 1,560 µm that contained Cu core diameters ranging from 79 to 320 µm, respectively. As shown in FIGS. 8A-8D, the process resulted in an asymmetric cladding of the core wire, which is attributed to asymmetry in the wire feed mechanism. Thus, core positioning is constrained by the die design. It should be noted that one of the primary focuses of this study, is TENG fiber assembly into 3D and form-fitting constructs rather than optimization of core position. It should be noted that the inventive principles and concepts are not limited with respect to the diameters of the core and cladding of the fibers, or their relative positions, as will be understood by persons of skill in the art in view of the description provided herein.

Figure 9A:
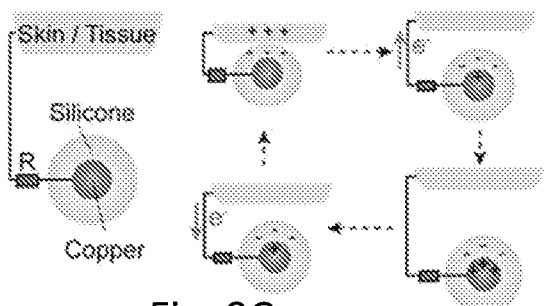
FIGS. 9A-9J depict various measurement formats that can be used to characterize the triboelectric operations of the 3D-printed elastomeric metal-core silicone-Cu fibers and devices depicted in FIGS. 2A-2K.

Triboelectric performance: 3D-printed elastomeric metal-core silicone-Cu fibers and devices can be characterized in various measurement formats. As wearable triboelectric mechanosensors described in the following sections, the Cu wire was directly connected to the test samples (e.g., the skin or the organ), and the triboelectric fiber worked in the contact-separation mode. An example of the working mechanism shown in FIG. 9A. In this example, the skin served as the first triboelectric material and the ground, whereas the silicone cladding of the TENG fiber served as the second triboelectric material. The Cu core of the TENG fiber served as the electrode. Triboelectric fibers facilitate energy harvesting based on the coupling of triboelectrification and electrical induction effects. Silicone is among the most negatively charged materials in the triboelectric series, and thus, provides an excellent candidate for wearable triboelectric devices driven via skin contact. As shown in FIG. 9A, contact between the skin and the silicone-Cu fiber results in electrons in the skin being attracted to the silicone layer of the TENG, because the latter lies in a more negative location in the triboelectric series. When the skin moves away, the accumulated negative charge on silicone induces a positive charge in the Cu wire for compensation, which creates current flow from the skin to the fiber. Similarly, when the skin re-contacts the silicone, the current returns to the skin. No current is present when equilibrium has been reached. Thus, triboelectric fibers generate alternating current associated with repetitive triboelectric charge transfer cycles, during which the electrical potential of the Cu wire increases with decreasing separation distance between the two triboelectric materials (e.g., skin and silicone).

Figure 9B:
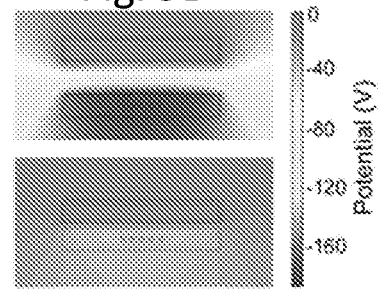
Figure 9C:
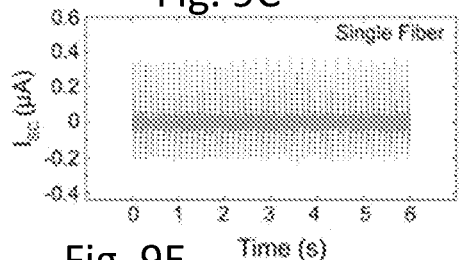
Figure 9D:
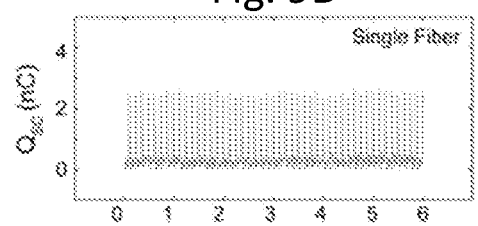
Figure 9E:
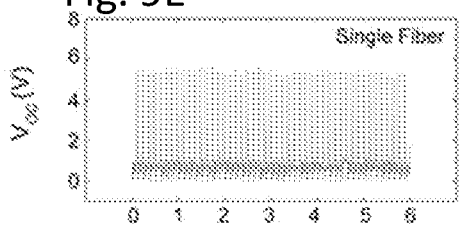

The amplitude of the induced current depends on the amount of the transferred charge and the frequency of the contact event. Static and dynamic finite element simulations of the working mechanism are shown in FIG. 9B in terms of the electrical potential distribution established by the two interacting triboelectric materials. As shown in FIG. 9B, motion of the two triboelectric materials established an electrical potential distribution that drove charge transfer. When the distance between the materials decreased, the electrical potential of the Cu wire increased, and vice versa.

Figure 9F:
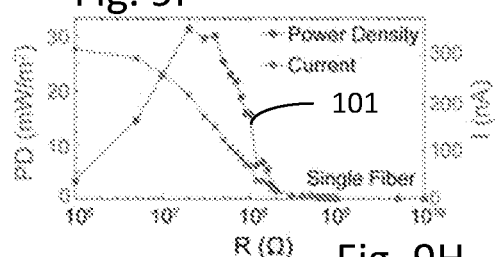
Figure 10B:
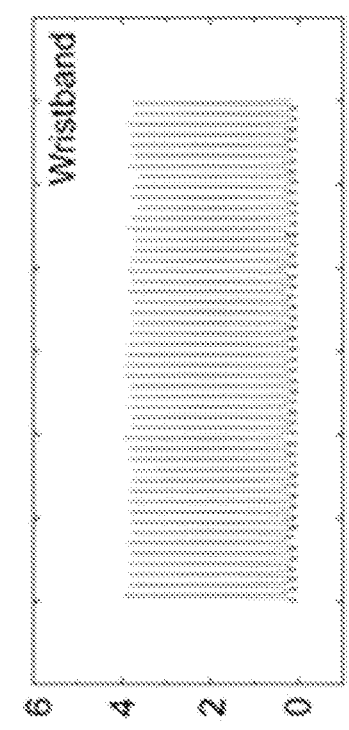
FIGS. 10A-10D are plots demonstrating the triboelectric response of a 3D-printed wristband made with Silicone-Cu TENG fibers in accordance with a representative embodiment.
Figure 10D:
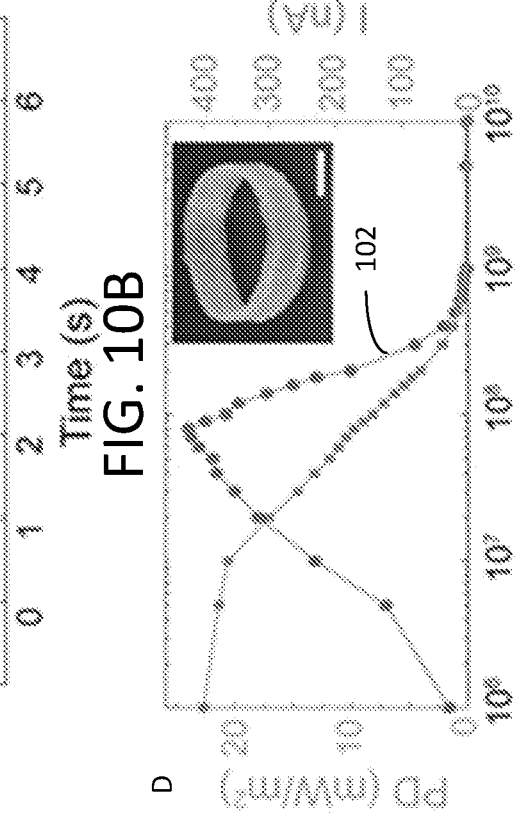
Figure 10A:
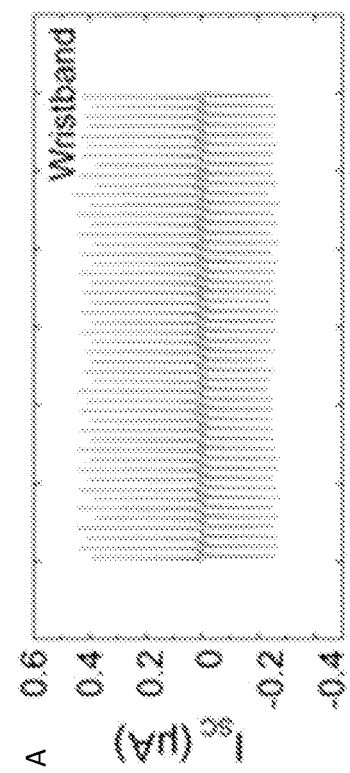
Figure 10C:
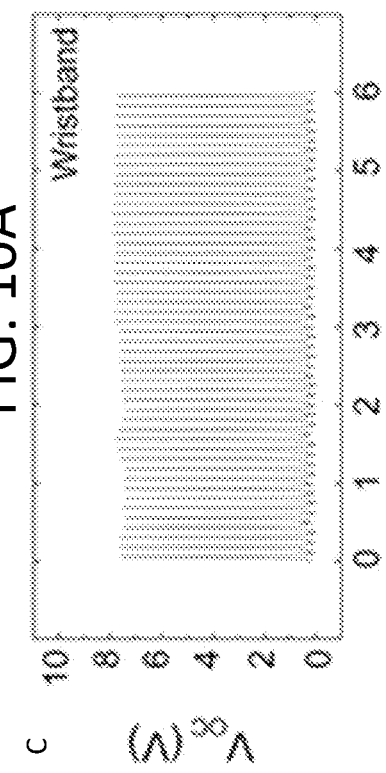

The triboelectric responses of single elastomeric metal-core silicone-Cu fibers (diameter=700 µm; length=2.5 cm) and 3D-printed wristbands (testing contact area=1×1 cm$^2$) were quantified with cyclic loading tests. The triboelectric responses of the single silicone-Cu fibers and 3D-printed wristbands in terms of the short-circuit current ($I_{SC}$), transferred charge (Q), and open-circuit voltage ($V_{OC}$) are provided in FIGS. 9C-9E and FIGS. 10A-10C, respectively. The single fibers exhibited $I_{SC}$, $V_{OC}$, and Q maxima of 0.38 µA, 5.75 V, and 2.65 nC, respectively, while the wristbands exhibited maxima of 0.46 µA, 8.01 V, and 3.97 nC, respectively. Studies were also conducted using various loads that allowed current flow to examine the corresponding power density (PD). The corresponding PD was calculated as PD=$I^2$R/A, where I is the current, R is the resistance of the external load, and A is the contact area. As can be seen by the curves 101 and 102 shown in FIGS. 9F and 10D, respectively, the single TENG fibers (FIGS. 2B and 2C) and 3D-printed wristbands (FIG. 2H) exhibit a maximum PD of 31.39 and 23.94 mW m$^{-2}$, respectively. The decreased maximum PD of the wristband relative to the single fiber is associated with the wristband's relatively decreased Cu-to-silicone volume ratio, which caused a relatively lower induced charge for the same loading conditions.

Figure 9G:
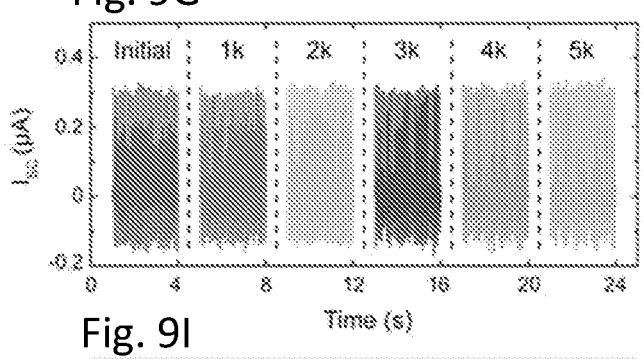
Figure 9H:
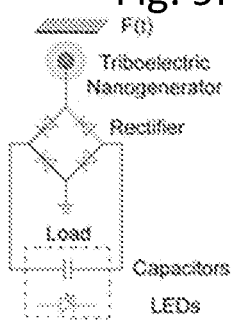
Figure 9I:
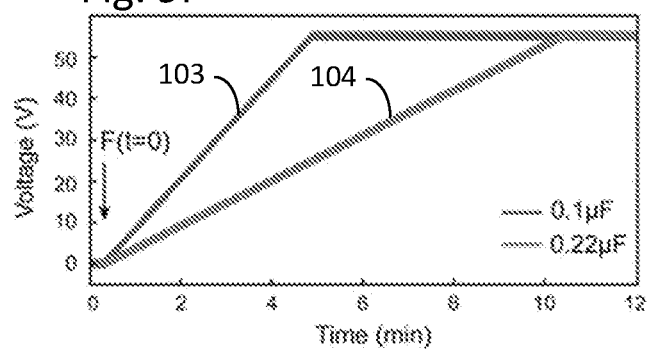
Figure 9J:
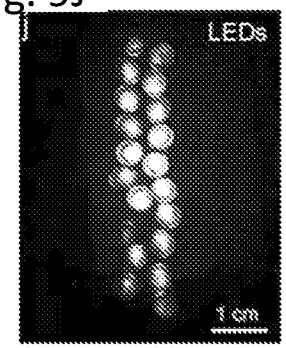

To further verify the durability of the 3D-printed TENG fibers, a 5000-cycle loading test was performed using a force amplitude of 50 N. 50 N was selected as the applied force amplitude in the cyclic loading study based on its established use as the upper limit of the dynamic range associated with force sensors for human motion monitoring applications. As shown in FIG. 9G, no visible decay in $I_{SC}$ was observed after 5000 loading cycles, which indicated that the silicone-Cu TENG fibers and 3D-printed constructs could serve as reliable transducers for sensing and energy harvesting applications. The circuit for a 3D-printed silicone-Cu TENG fiber-based energy harvester and the measured charging curves associated with charging of two commercial capacitors using a single silicone-Cu TENG fiber are shown in FIGS. 9H and 9I, respectively. The plots 103 and 104 in FIG. 9I indicate that the voltage saturated at 55 V after 4.5 min and 10.1 min for the 0.1 and 0.22 µF capacitors, respectively. FIG. 9J, which shows a single silicone-Cu TENG fiber powering twenty LEDs, demonstrates that the generated energy could be consumed instantaneously.

Organ monitoring: Having demonstrated that the extruded elastomeric metal-core fibers can be highly flexible, can be 3D printed in various structures, and can serve as reliable TENGs, it will now be demonstrated that the response of 3D-printed TENG fiber-based triboelectric devices enable sensing of mechanical motions associated with perfusion-induced organ edema, a significant problem encountered in ex vivo machine perfusion-based organ preservation processes. In addition to a suite of conformal bioanalytical devices for non-invasive isolation of biomarkers from perfused organs and biosensors for compositional analysis of perfusate and microfluidic biopsy samples, next-generation ex vivo machine perfusion systems by necessity should incorporate low-power sensors for real-time monitoring of organ edema (i.e., swelling). With reference again to FIGS. 3A-3E, a form-fitting organ-conforming stretchable TENG Fiber-based mesh mechanosensory is shown for monitoring of perfused organs. FIG. 3A is a schematic diagram illustrating conformal 3D printing of the elastomeric metal-core TENG fiber mesh sensor 40 on objects with organic shape, specifically, a 3D-printed porcine kidney model 41, for fabrication of form-fitting wearable triboelectric devices. FIG. 3B is a photograph of a custom machine perfusion apparatus. FIG. 3C is a photograph of the 3D-printed kidney-conforming TENG fiber-based mesh sensor 40 disposed on the porcine kidney. FIG. 3D is representative point cloud data acquired via 3D scanning of perfused porcine kidneys at t=0, 64, and 124 min. FIG. 3E shows real-time responses of organ displacement associated with perfusion-induced edema acquired using 3D scanning shown with the corresponding $V_{OC}$ response of the 3D-printed TENG fiber-based mesh sensor 40.

As shown in FIGS. 3A-3C, the process disclosed herein enabled the fabrication of the organ-conforming fiber-based mesh triboelectric mechanosensor 40 by conformal 3D printing of TENG fibers on anatomical models of porcine kidneys. Swelling-associated increases in the organ-mesh contact area, due to interstitial edema, drove electron transfer between perfused kidney and the form-fitting triboelectric sensor. As shown in FIG. 3D (point cloud data), the perfused kidneys swelled ~20% in height over the course of a 2-hour normothermic machine-perfusion interval. As shown in FIG. 3E, the real-time $V_{OC}$ response 43 of the sensor 40 agreed reasonably well with the surface displacement measured by 3D scanning point cloud data 42 obtained by the system shown in FIG. 3B throughout the preservation interval, which contained a 5-minute baseline equilibration period (with no perfusion) followed by a 1-hour machine perfusion period.

Following the 1-hour perfusion period, the perfusate flow was stopped and the kidney was continuously monitored throughout a further 1-hour post-perfusion period. Both the sensor $V_{OC}$ and the kidney surface displacement increased monotonically throughout the preservation period. Stopping the perfusate flow caused a continuous decrease in both signals over the course of the next 6 min. $V_{OC}$ increased to a maximum of ~70 V, which occurred at the end of the perfusion period, and ultimately stabilized at ~20 V at t ~120 min. Kidney displacement increased by a maximum of 32.7%, which similarly occurred at the end of the perfusion period, and decreased to a value of 19.7% at the end of the post-perfusion period and in the absence of perfusate flow. The data shown in FIG. 3E demonstrates that 3D-printed form-fitting constructs comprising silicone-Cu TENG fibers provides attractive self-powered, wearable mechanosensors for organ preservation and biomanufacturing applications, specifically real-time sensing of perfusion-induced edema.

Silent Speech: Having demonstrated that silicone-Cu TENG fibers enabled real-time monitoring of small deformations in organs, monitoring of human activities that involve small amounts of motion will now be examined. "Silent communication," also referred to as "silent speech" or "silent talk," is defined as sound-free communication among humans (i.e., verbal communication among humans in the absence of sound production by the speaker). An investigation was conducted to determine if a wearable 3D-printed triboelectric device could reliably detect and classify user speech in the absence of sound production by the speaker without the use of image-based facial expression monitoring.

With reference again to FIGS. 6A-6J, these figures demonstrate the ability of the 3D-printed stretchable wearable TENG fiber-based membrane to be used for Silent Speech. FIGS. 6D and 6E highlight the orthogonal stretchability of the TENG fiber-based membrane with zoomed views showing fiber orientation in the absence and presence of strain. As shown in FIG. 6A, integration of a 3D-printed TENG fiber-based membrane (1.8 mm thick) in a surgical mask provided effective mechanical coupling between the device and the speaker's face. Interwoven 3D-printed TENG fibers enabled the transduction of facial movements associated with silent speech to electrical response through the triboelectric effect (e.g., $I_{SC}$) (see FIGS. 6B and 6C). The sensor responses generated by the user's facial movements were subsequently used for real-time speech recognition via filtering, feature extraction, and classification based on the silent word spoken (the computational framework associated with speech classification is shown in FIG. 7).

As shown in FIGS. 6D and 6E, the 3D-printed TENG fiber-based membranes exhibited an elastic response up to engineering strains of ~20% in both vertical and horizontal directions. In contrast to single fibers, which were highly flexible but exhibited limited stretchability constrained by the elasticity of the fiber's metal core, 3D-printed constructs could be printed with toolpaths that resulted in highly stretchable devices (e.g., serpentine patterned). FIG. 6F shows the raw sensor data generated through the cumulative triboelectric effect in the sensor, which contained 60, 120, and 180 Hz noise. The filtered data corresponding to the user speaking the number "three," the letter "D," and the word "print" with no sound production presented in FIGS. 6G-6I indicate that each sound produced a distinguishable waveform, demonstrating that the platform may provide opportunities for silent speech-based communication by combination with time-series data classification methods. The observation of distinguishable signals associated with each of the three sounds (three, D, print) was consistent among multiple human subjects (n=3).

With reference again to FIG. 7, various supervised machine learning models were trained to classify each word that was silently spoken, including Linear Discriminant Analysis, Linear Support Vector Machine (SVM), Quadratic SVM, Gaussian SVM, and K-nearest Neighbors models. Various models, including Linear SVM, Quadratic SVM, Gaussian SVM, and K-nearest Neighbors, enabled recognition of the silently spoken word (i.e., word classification in the absence of sound production by the speaker) with greater than 95% accuracy. The Linear Discriminant Analysis model exhibited the lowest word classification accuracy of 74.8%. The Quadratic SVM, Linear SVM, and K-nearest Neighbor models exhibited relatively higher word classification accuracies of 98.4, 98.4, and 98.1%, respectively. The Gaussian SVM model yielded the highest word classification accuracy of 99.2%. FIG. 6J illustrates the effect of the training sample size on the word classification accuracy for the Gaussian SVM model. Word classification accuracies exceed 95% accuracy for training sample sizes greater than 85 samples.

In other aspects of the embodiments, the coaxial microextrusion wire encapsulation process provides a unique capability for producing fibers with elastomeric claddings. Silicone and Cu were selected as the cladding and core, respectively, based on their relative positions in the triboelectric series. For example, silicone rubber is among the most negatively charged materials in the triboelectric series, while skin is among the most positively charged materials. Thus, elastomeric metal-core silicone-Cu TENG fibers provide attractive material properties for wearable triboelectric systems. As indicated above, however, other electrically-conductive materials and elastomeric materials can be used for the core and the cladding, respectively, as will be understood by those of skill in the art in view of the description provided herein.

In addition to the large negative charge of silicone, making it an excellent candidate for triboelectric devices, silicone is an elastomer, which offers desirable mechanical properties in resultant fibers and devices. For example, as shown in FIGS. 2C and 6D, silicone claddings lead to highly flexible single TENG fibers and stretchable 3D-printed triboelectric devices, although materials other than silicone can be used as the cladding material. With reference to again to FIGS. 6D and 6E, the 3D-printed triboelectric membranes with serpentine toolpaths exhibited an elastic response up to an engineering strain ($\Delta L/L_0$) of ~20%, where $\Delta L$ is the length change and $L_0$ is the initial length. Silicone claddings also offer improved biomechanical matching characteristics relative to other fibers. For example, the Young's modulus of silicone is 440 kPa, which is in the range of the Young's modulus of skin (E=420-850 kPa) and lower than other thermoplastic claddings, such as polysulfone (E~2,600 kPa).

The table shown in FIG. 11 lists mechanical properties of the TENG fiber-based membranes obtained from tensile testing studies (Young's modulus and UTS). The values show in the table agreed with previously reported properties of 3D-printed silicone membranes. While the influence of silicone-copper adhesion was not observed in the tensile testing studies, additional material processing techniques could be used for improving silicone-copper adhesion strength for applications that may generate asymmetric strain in the core and cladding materials. For example, plasma treatment of copper and other metals can be used to improve the adhesion strength of polymer coatings, including epoxy resins and organopolysiloxanes.

The rheological properties of elastomers make them excellent candidates for micro-extrusion 3D printing. For example, elastomers can exhibit Herschel-Bulkley rheological properties, defined as a power-law fluid with a yield stress. Uncured silicone elastomers can exhibit yield stresses that are sufficient to enable 3D printing of free-standing constructs. In addition to desirable rheological properties, silicone also exhibits high self-adhesion and substrate adhesion, which facilitates layer-by-layer assembly of 3D structures and conformal 3D printing, respectively. As shown in FIGS. 2A-2K and 3A-3E, silicone-Cu TENG fibers 10 can be assembled into various structures and form factors via 3D printing, including 3D constructs and form-fitting systems. When considering the material and mechanical properties of the silicone-Cu TENG fiber system, the present disclosure presents an advance in 3D printing of fiber-based functional materials and devices, which commonly exhibit single-fiber or woven device formats composed of fibers with relatively more rigid thermoplastic claddings.

The continued, unmet demand for high-quality transplantable organs, such as kidneys, for example, remains a driving force for the creation of novel organ preservation processes and sensors for real-time monitoring of organs, from real-time organ bioanalysis to real-time characterization of organ biophysical and mechanical properties. Perfusion-induced organ edema (swelling) remains an important problem for organ preservation. While edema during the reperfusion phase is expected, excessive edema is detrimental to organ health. Kidneys, as highly vascularized organs, will swell during perfusion caused by the reintroduction of fluid and tissue edema. The 3D-printed TENG fiber-based mesh membrane shown in FIG. 3C enabled real-time monitoring of machine-perfused kidney swelling response (up to increases of 32.7%). The observed swelling response associated with perfusion-induced edema is consistent with previous reports. The advantages of this 3D-printed triboelectric sensor in an organ preservation setting include self-powering capability, form-fitting design, and a real-time monitoring capability (sampling rate=1 kHz). The detection of organ swelling during machine perfusion allows interventions that may lead to better organ preservation.

Systems for silent communication, such as silent speech interfaces, have various applications, including assisted communication among the soldiers and individuals affected by speech-related disabilities. A silent speech interface is traditionally defined as a device that allows speech communication without using the sound made when individuals vocalize their speech sounds, regardless of whether sound is produced. The most commonly used silent speech interfaces are based on simultaneous monitoring of sound production and facial expression. Thus, they require high-dimensional image data and image processing methods, which are typically computationally intensive, as well as the use of imaging systems for facial monitoring, which increases power demands, creates the need for conventional power supplies, and limits system portability and human integration. Alternatively, 3D-printed silicone-Cu TENG fiber-based devices in accordance with the inventive principles and concepts disclosed herein provide a self-powered wearable system for silent speech that offers various advantages, such as those associated with wearability, durability, power consumption, and compatibility with data-driven signal processing methods, such as machine learning. Overall, 3D-printed silicone-Cu TENG fiber-based devices provide attractive systems for silent speech without the need for sound production or image-based facial expression monitoring.

With reference again to FIGS. 1A-1H, these figures demonstrate examples of the design of the aforementioned customized manifolds 1 and printing substrates 8, 9, 11 and 32 in accordance with representative embodiments. FIG. 1A is a schematic diagram of the mechanism of coaxial fiber microextrusion apparatus 30 with customized manifolds 1. FIG. 1B is a CAD model of the two-part customized manifolds 1 shown in FIG. 1A in accordance with a representative embodiment. FIG. 1C is a cross-sectional plan view of the assembled customized manifolds 1 shown in FIG. 1B in accordance with a representative embodiment. FIGS. 1D and 1E are photographs of the fabrication process and of the finished customized manifolds, respectively, in accordance with a representative embodiment. FIGS. 1F-1H show CAD designs of customized substrates 11 and 32 with anchor pins 12 and 33, respectively, for fabricating cuboid-shaped 3D structures, star-shaped 3D structures, and a fiber-based sensing pad, respectively.

Figure 12:
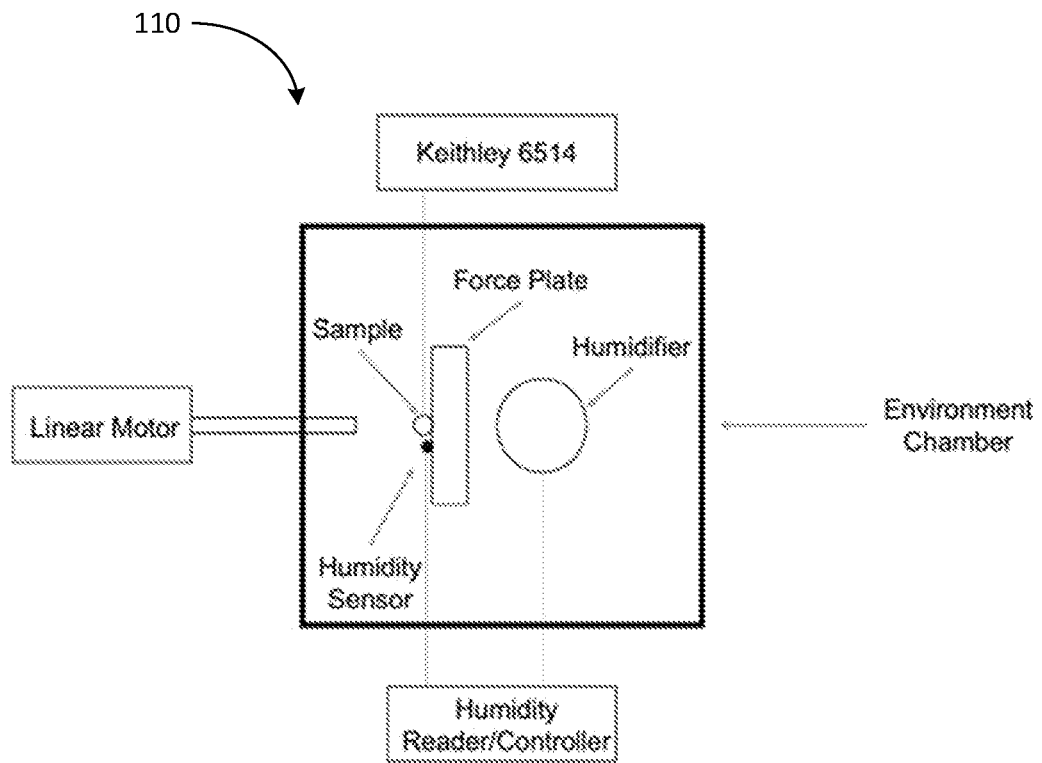
FIG. 12 shows a schematic of an experimental apparatus for measuring the effect of environment humidity on TENG output.
Figure 13:
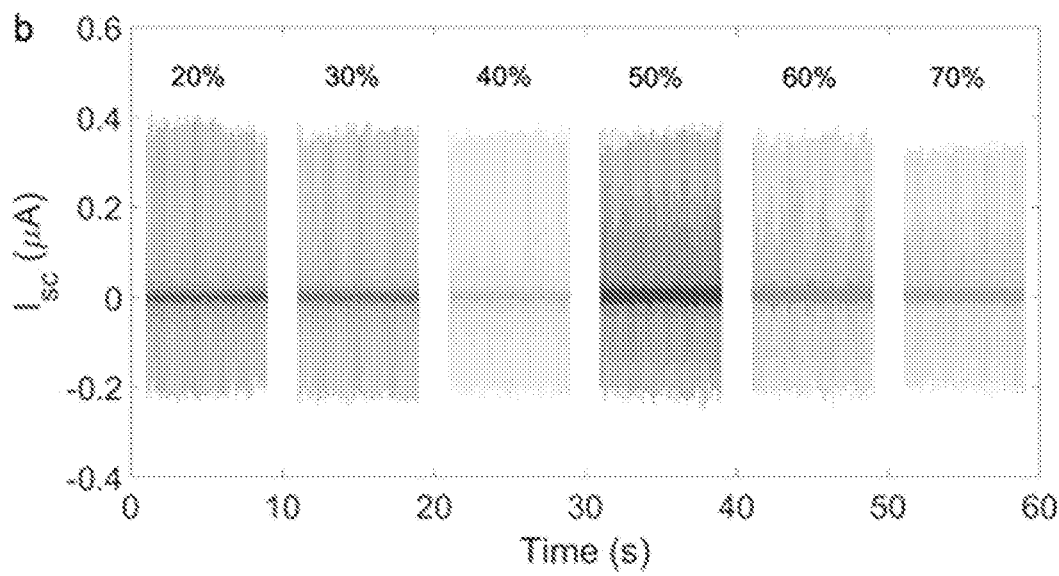
FIG. 13 is a plot of short-circuit current generated by a single fiber as a function of time under different humidities measured by the apparatus shown in FIG. 12.

The effect of humidity on the TENG fiber output was also investigated. FIG. 12 shows a Schematic of an experimental apparatus 110 for measuring the effect of environment humidity on TENG output. FIG. 13 is a plot of short-circuit current generated by a single fiber as a function of time under different humidities measured by the apparatus 110 shown in FIG. 12. The data show that changes in relative humidity caused a minimal effect on the maximum short-circuit current, which decreased from 0.41 to 0.35 µA upon a relative humidity increase from 20% to 70%. Importantly, the fiber remained functional in the presence of humid environments.

The process disclosed herein for 3D printing elastomeric metal-core TENG fibers enabled rapid prototyping of self-powered wearable triboelectric systems. The utility and sensitivity of 3D-printed silicone-Cu TENG fibers and resultant triboelectric devices were demonstrated through applications to mechanosensing in organ and human activity monitoring. 3D-printed wearable triboelectric devices and supervised learning algorithms enabled high-accuracy real-time silent speech. Ultimately, the ability to 3D print elastomeric metal-core TENG fibers on stationary or moving planar and non-planar substrates has broad implications in the fabrication of wearable triboelectric devices.

While the fabrication process has been described above as a 3D printing process, it should be noted that the elastomeric metal-core TENG fibers can be fabricated by other fabrication processes, such as a traditional draw tower process, a wire drawing process, and other types of extrusion processes. Also, while the core has been described as a metal wire, it can instead be an electrically-conductive fiber.

Aspects According to Inventive Principles and Concepts

Some of the aspects according to the inventive principles and concepts include the following. In accordance with one aspect, a flexible TENG fiber is provided comprising a fiber core comprising an electrically-conductive wire or fiber and an elastomeric cladding surrounding the fiber core. In accordance with another aspect, the electrically-conductive wire or fiber comprises a copper wire or fiber and the elastomeric cladding comprises silicone. In accordance with another aspect, the TENG fiber has an outer diameter that ranges from about 50 micrometers to about 2.5 centimeters.

In accordance with another aspect, a 2D or 3D construct is provided comprising a plurality of the flexible TENG fibers arranged in a preselected pattern to form a triboelectric mechanosensory. In accordance with another aspect, the construct is a 3D construct having a preselected shape. In accordance with another aspect, the 3D construct has a hollow center that is formed by the flexible TENG fibers being arranged in stack in the preselected pattern. In accordance with another aspect, the 3D construct is formed by the flexible TENG fibers being arranged in a preselected crossing pattern in which at least some of the flexible TENG fibers cross over other of the TENG fibers.

In accordance with another aspect, the 3D construct is integrated into a wearable device intended to be worn by a user. The 3D construct outputs electrical signals that can be measured for monitoring movements of the user.

In accordance with another aspect, the 3D construct comprises a triboelectric membrane integrated into a facemask and configured for silent speech detection. The design of the triboelectric membrane-integrated facemask is such that when the facemask is worn by a user, the triboelectric membrane is positioned over the user's mouth and outputs different electrical signals based on different words mouthed by the user.

In accordance with another aspect, the 3D construct comprises a triboelectric organ-conforming stretchable mesh disposed on a surface of an organ for monitoring movement of the organ. The triboelectric organ-conforming stretchable mesh generates output electrical signals in accordance with movements of the organ that can be measured to monitor movements of the organ over time. In accordance with another aspect, the triboelectric organ-conforming stretchable mesh is disposed on a kidney for monitoring perfusion-induced edema of the kidney. In accordance with another aspect, the flexible TENG fiber has a stretchability that is greater than 150%. In accordance with another aspect, the flexible TENG fiber has a stretchability that is greater than 600%.

In accordance with another aspect, a method for fabricating a flexible TENG fiber is provided, comprising: with a manifold having an inner barrel and an outer extrusion barrel surrounding the inner barrel, feeding an electrically-conductive (EC) wire or fiber through a first opening formed in a first end of the barrel and out of a second opening formed in a second end of the barrel such that an end portion of the wire or fiber is disposed outside of the second end of the barrel; anchoring the end portion of the EC wire or fiber to a surface of a substrate; and with the outer extrusion barrel having an elastomeric material disposed therein, subjecting the elastomeric material to pressure conditions to cause the elastomeric material to be extruded through an extrusion nozzle located at an end of the manifold, the extrusion nozzle acting as an extrusion die for aligning EC wire or fiber with the elastomeric material being extruded such that the extruded elastomeric material forms a cladding that surrounds the EC wire or fiber in a substantially coaxial relationship, the extruded EC wire or fiber surrounded by the cladding comprising a flexible triboelectric nanogenerator (TENG) fiber.

In accordance with another aspect, the method further comprises: with a motion control system mechanically coupled to the manifold, imparting preselected motion to the manifold as the EC wire or fiber and the surrounding cladding are extruded from the extrusion nozzle to form a two-dimensional (2D) or three-dimensional (3D) construct comprising a plurality of the flexible TENG fibers arranged in a preselected pattern to form a triboelectric mechanosensory.

It should be noted that the illustrative embodiments have been described with reference to a few embodiments for the purpose of demonstrating the principles and concepts of the invention. Persons of skill in the art will understand how the principles and concepts of the invention can be applied to other embodiments not explicitly described herein. For example, while particular fiber embodiments and sensor configurations are described herein and shown in the figures, a variety of other embodiments and configurations may be used. Also, the applications for which the fibers and sensors are used are not limited to the example applications described herein. As will be understood by those skilled in the art in view of the description provided herein, many modifications may be made to the embodiments described herein while still achieving the goals of the invention, and all such modifications are within the scope of the present disclosure.

Therefore, the following is claimed:

1. A method for fabricating a flexible triboelectric nanogenerator (TENG) fiber, the method comprising:
    with a manifold having an inner barrel and an outer extrusion barrel surrounding the inner barrel, feeding an electrically-conductive (EC) wire or fiber through a first opening formed in a first end of the barrel and out of a second opening formed in a second end of the barrel such that an end portion of the wire or fiber is disposed outside of the second end of the barrel;
    anchoring the end portion of the EC wire or fiber to a surface of a substrate;
    with the outer extrusion barrel having an elastomeric material disposed therein, subjecting the elastomeric material to pressure conditions to cause the elastomeric material to be extruded through an extrusion nozzle located at an end of the manifold, the extrusion nozzle acting as an extrusion die for aligning EC wire or fiber with the elastomeric material being extruded such that the extruded elastomeric material forms a cladding that surrounds the EC wire or fiber in a substantially coaxial relationship, the extruded EC wire or fiber surrounded by the cladding comprising a flexible triboelectric nanogenerator (TENG) fiber; and
    with a motion control system mechanically coupled to the manifold, imparting preselected motion to the manifold as the EC wire or fiber and the surrounding cladding are extruded from the extrusion nozzle to form a two-dimensional (2D) or three-dimensional (3D) construct comprising a plurality of the flexible TENG fibers arranged in a preselected pattern to form a triboelectric mechanosensory.

2. The method of claim 1, wherein the electrically-conductive wire or fiber comprises a copper wire or fiber and the elastomeric cladding comprises silicone.

3. The method of claim 1, wherein each TENG fiber has an outer diameter that ranges from about 50 micrometers to about 2.5 centimeters.

4. The method of claim 1, wherein the method is performed by a 3D printer system in which the manifold and the motion control system are implemented.

5. The method of claim 1, wherein the 2D or 3D construct is a 3D construct having a preselected shape.

6. The method of claim 1, wherein the 3D construct comprises a triboelectric membrane integrated into a facemask and configured for silent speech detection, and wherein the design of the triboelectric membrane-integrated facemask is such that when the facemask is worn by a user, the triboelectric membrane is positioned over the user's mouth and outputs different electrical signals based on different words mouthed by the user.

7. The method claim 1, wherein the 3D construct comprises a triboelectric organ-conforming stretchable mesh disposed on a surface of an organ for monitoring movement of the organ, the triboelectric organ-conforming stretchable mesh generating output electrical signals in accordance with movements of the organ that can be measured to monitor movements of the organ over time.

8. A method for fabricating a two-dimensional (2D) or three-dimensional (3D) construct, the method comprising:
with a manifold having an inner barrel and an outer extrusion barrel surrounding the inner barrel, feeding an electrically-conductive (EC) wire or fiber through a first opening formed in a first end of the barrel and out of a second opening formed in a second end of the barrel such that an end portion of the wire or fiber is disposed outside of the second end of the barrel;
with the outer extrusion barrel having an elastomeric material disposed therein, subjecting the elastomeric material to pressure conditions to cause the elastomeric material to be extruded through an extrusion nozzle located at an end of the manifold, the extrusion nozzle acting as an extrusion die for aligning EC wire or fiber with the elastomeric material being extruded such that the extruded elastomeric material forms a cladding that surrounds the EC wire or fiber in a substantially coaxial relationship, the extruded EC wire or fiber surrounded by the cladding comprising a flexible triboelectric nanogenerator (TENG) fiber;
with a motion control system mechanically coupled to the manifold, imparting preselected motion to the manifold as the EC wire or fiber and the surrounding cladding are extruded from the extrusion nozzle; and
arranging a plurality of flexible TENG fibers in a preselected pattern to form a triboelectric mechanosensory, the plurality of flexible TENG fibers comprising the flexible TENG fiber.

9. The method of claim 8, wherein the electrically-conductive wire or fiber comprises a copper wire or fiber and the elastomeric cladding comprises silicone.

10. The method of claim 8, wherein the flexible TENG fiber has an outer diameter that ranges from about 50 micrometers to about 2.5 centimeters.

11. The method of claim 8, wherein the flexible TENG fiber has a stretchability that is greater than 600%.

12. The method of claim 8, wherein the construct is a 3D construct having a preselected shape.

13. The method of claim 12, wherein the 3D construct has a hollow center that is formed by the plurality of flexible TENG fibers being arranged in stack in the preselected pattern.

14. The method of claim 12, wherein the 3D construct is formed by the plurality of flexible TENG fibers being arranged in a preselected crossing pattern in which at least some of the plurality of flexible TENG fibers cross over at least some other of the plurality of TENG fibers.

15. The method of claim 12, wherein the 3D construct is integrated into a wearable device intended to be worn by a user, the 3D construct outputting electrical signals that can be measured for monitoring movements of the user.

16. The method of claim 12, wherein the 3D construct comprises a triboelectric membrane integrated into a facemask and configured for silent speech detection, and wherein the design of the triboelectric membrane-integrated facemask is such that when the facemask is worn by a user, the triboelectric membrane is positioned over the user's mouth and outputs different electrical signals based on different words mouthed by the user.

17. The method of claim 12, wherein the 3D construct comprises a triboelectric organ-conforming stretchable mesh disposed on a surface of an organ for monitoring movement of the organ, the triboelectric organ-conforming stretchable mesh generating output electrical signals in accordance with movements of the organ that can be measured to monitor movements of the organ over time.

18. The method of claim 17, wherein the triboelectric organ-conforming stretchable mesh is disposed on a kidney for monitoring perfusion-induced edema of the kidney.

* * * * *